United States Patent
Carbune et al.

(10) Patent No.: US 11,188,626 B2
(45) Date of Patent: Nov. 30, 2021

(54) MULTI-USER LOGIN SESSION

(71) Applicant: Google LLC, Mountain View, CA (US)

(72) Inventors: Victor Carbune, Zurich (CH); Daniel Keysers, Stallikon (CH); Thomas Deselaers, Zurich (CH)

(73) Assignee: Google LLC, Mountain View, CA (US)

( * ) Notice: Subject to any disclaimer, the term of this patent is extended or adjusted under 35 U.S.C. 154(b) by 278 days.

(21) Appl. No.: 16/477,062

(22) PCT Filed: Jan. 20, 2017

(86) PCT No.: PCT/US2017/014384
§ 371 (c)(1),
(2) Date: Jul. 10, 2019

(87) PCT Pub. No.: WO2018/136081
PCT Pub. Date: Jul. 26, 2018

(65) Prior Publication Data
US 2019/0342282 A1 Nov. 7, 2019

(51) Int. Cl.
*G06F 21/31* (2013.01)
*H04L 29/06* (2006.01)
*H04W 12/06* (2021.01)

(52) U.S. Cl.
CPC .......... *G06F 21/31* (2013.01); *H04L 63/0815* (2013.01); *H04L 63/102* (2013.01); *H04L 63/104* (2013.01); *H04W 12/068* (2021.01)

(58) Field of Classification Search
CPC combination set(s) only.
See application file for complete search history.

(56) References Cited

U.S. PATENT DOCUMENTS

| | | | |
|---|---|---|---|
| 9,936,044 B2 * | 4/2018 | Allinson | H04L 67/306 |
| 10,431,188 B1 * | 10/2019 | Nelson | G09G 5/363 |
| 2009/0267968 A1 | 10/2009 | Liao et al. | |

(Continued)

FOREIGN PATENT DOCUMENTS

| | | |
|---|---|---|
| JP | 2003271483 | 9/2003 |
| JP | 2005109922 | 4/2005 |

(Continued)

OTHER PUBLICATIONS

Christian Beier, "Collakit—A Multi-User Multicast Collaboration System based on VNC", Diplomarbeit, Humboldt University Berlin, Apr. 19, 2011 (Apr. 19, 2011), p. 118.

*Primary Examiner* — Harris C Wang
(74) *Attorney, Agent, or Firm* — McDonnell Boehnen Hulbert & Berghoff LLP

(57) ABSTRACT

An example method includes establishing a single-user login session associated with a first user-account such that the single-user login session has read and/or write access to first user data associated with the first user-account. The method further includes accepting, within the single-user login session, a further login associated with a second user-account to convert the single-user login session to a multi-user login session having read and/or write access to second user data associated with the second user-account in addition to having read and/or write access to the first user data. Computer readable media and computing devices related to the example method are disclosed herein as well.

20 Claims, 14 Drawing Sheets

(56) References Cited

U.S. PATENT DOCUMENTS

| | | | | |
|---|---|---|---|---|
| 2013/0073980 | A1* | 3/2013 | Amendolagine | G06F 3/04847 715/751 |
| 2015/0011189 | A1* | 1/2015 | Shin | H04L 63/102 455/411 |
| 2016/0063226 | A1* | 3/2016 | Singh | H04L 67/306 726/3 |
| 2017/0289090 | A1* | 10/2017 | Yao | H04L 51/10 |
| 2018/0077248 | A1* | 3/2018 | Srour | H04L 67/18 |
| 2019/0342282 | A1* | 11/2019 | Carbune | G06F 21/31 |
| 2020/0304941 | A1* | 9/2020 | Cohen | H04W 76/10 |

FOREIGN PATENT DOCUMENTS

| | | |
|---|---|---|
| JP | 2012009035 | 1/2012 |
| JP | 2014191402 | 10/2014 |
| JP | 2016177520 | 10/2016 |
| KR | 10-2017-0049513 | 5/2017 |
| WO | 33/091889 | 11/2003 |
| WO | 2016/191064 | 12/2016 |

* cited by examiner

MULTI-USER LOGIN SESSION

This application is a national stage entry of, and claims the benefit of, International (PCT) Application No. PCT/US2017/014384, filed Jan. 20, 2017, which is fully incorporated herein by reference.

BACKGROUND

Operating systems, applications, or web services may provide functionality that is customized on a per user basis and may additionally only allow access to data that is associated with a single authenticated user.

SUMMARY

For various collaborative purposes, it may be useful for two or more users to participate in a multi-user login session provided by a single computing device. During the multi-user login session, the computing device may access, read, or write to data respectively associated with two or more user-accounts. For example, as a user operates the computing device during the multi-user login session, the user may be able to search emails, calendar entries, or browser histories associated with two or more user-accounts simultaneously. The user experience provided by the computing device's graphical user interface may also be customized for the two or more user-accounts participating in the multi-user login session by accessing user data respectively associated with the two or more user-accounts.

Accordingly, a computing device may first establish a single-user login session associated with a first user-account such that the single-user login session has read and/or write access to first user data that is associated with the first user-account. The computing device may then accept, within the single-user login session, a further login associated with a second user-account to convert the single-user login session to a multi-user login session having read and/or write access to second user data associated with the second user-account in addition to having read and/or write access to the first user data.

In one example, a method includes establishing a single-user login session associated with a first user-account such that the single-user login session has read and/or write access to first user data associated with the first user-account. The method further includes accepting, within the single-user login session, a further login associated with a second user-account to convert the single-user login session to a multi-user login session having read and/or write access to second user data associated with the second user-account in addition to having read and/or write access to the first user data.

In another example, a computer readable medium stores instructions that, when executed by one or more computing devices, cause the one or more computing devices to perform functions. The functions include establishing a single-user login session associated with a first user-account such that the single-user login session has read and/or write access to first user data associated with the first user-account. The functions further include accepting, within the single-user login session, a further login associated with a second user-account to convert the single-user login session to a multi-user login session having read and/or write access to second user data associated with the second user-account in addition to having read and/or write access to the first user data.

In yet another example, one or more computing devices each include one or more processors and a non-transitory computer readable medium storing instructions that, when executed by the one or more computing devices, cause the one or more computing devices to perform functions. The functions include establishing a single-user login session associated with a first user-account such that the single-user login session has read and/or write access to first user data associated with the first user-account. The functions further include accepting, within the single-user login session, a further login associated with a second user-account to convert the single-user login session to a multi-user login session having read and/or write access to second user data associated with the second user-account in addition to having read and/or write access to the first user data.

In yet another example, a system is provided. The system includes means for establishing a single-user login session associated with a first user-account such that the single-user login session has read and/or write access to first user data associated with the first user-account. The system further includes means for accepting, within the single-user login session, a further login associated with a second user-account to convert the single-user login session to a multi-user login session having read and/or write access to second user data associated with the second user-account in addition to having read and/or write access to the first user data.

In another example, a method includes receiving, by a first computing device from a second computing device, a first user credential and a second user credential. The method further includes determining, by the first computing device, that the first user credential corresponds to a first user-account and that the second user credential corresponds to a second user-account. The method further includes, in response to determining that the first user credential corresponds to the first user-account and that the second user credential corresponds to the second user-account, analyzing first data and second data. The first data is access-protected via the first user credential and is associated with the first user-account, and the second data is access-protected via the second user credential and is associated with the second user-account. The method further includes sending, to the second computing device, output data that is customized for both the first user-account and the second user-account based on the analysis of the first data and the second data.

In yet another example, a non-transitory computer readable medium stores instructions that, when executed by a first computing device, cause the first computing device to perform functions. The functions include receiving, from a second computing device, a first user credential and a second user credential. The functions further include determining that the first user credential corresponds to a first user-account and that the second user credential corresponds to a second user-account. The functions further include, in response to determining that the first user credential corresponds to the first user-account and that the second user credential corresponds to the second user-account, analyzing first data and second data. The first data is access-protected via the first user credential and is associated with the first user-account, and the second data is access-protected via the second user credential and is associated with the second user-account. The functions further include sending, to the second computing device, output data that is customized for both the first user-account and the second user-account based on the analysis of the first data and the second data.

In yet another example, a first computing device includes one or more processors and a non-transitory computer readable medium storing instructions that, when executed by the one or more processors, cause the first computing device to perform functions. The functions include receiving, from a second computing device, a first user credential and a second user credential. The functions further include determining that the first user credential corresponds to a first user-account and that the second user credential corresponds to a second user-account. The functions further include, in response to determining that the first user credential corresponds to the first user-account and that the second user credential corresponds to the second user-account, analyzing first data and second data. The first data is access-protected via the first user credential and is associated with the first user-account, and the second data is access-protected via the second user credential and is associated with the second user-account. The functions further include sending, to the second computing device, output data that is customized for both the first user-account and the second user-account based on the analysis of the first data and the second data.

In yet another example, a first computing device is provided. The first computing device includes means for receiving, from a second computing device, a first user credential and a second user credential. The first computing device further includes means for determining that the first user credential corresponds to a first user-account and that the second user credential corresponds to a second user-account. The first computing device further includes means for, in response to determining that the first user credential corresponds to the first user-account and that the second user credential corresponds to the second user-account, analyzing first data and second data. The first data is access-protected via the first user credential and is associated with the first user-account, and the second data is access-protected via the second user credential and is associated with the second user-account. The first computing device further includes means for sending, to the second computing device, output data that is customized for both the first user-account and the second user-account based on the analysis of the first data and the second data.

In yet another example, a method includes receiving, by a first computing device from a second computing device, a first user credential and a second user credential. The method further includes determining, by the first computing device, that the first user credential corresponds to a first user-account and that the second user credential corresponds to a second user-account. The method further includes, in response to determining that the first user credential corresponds to the first user-account and that the second user credential corresponds to the second user-account, sending, to the second computing device, an indication that the first user credential corresponds to the first user-account and that the second user credential corresponds to the second user-account. The method further includes receiving, from the second computing device, instructions to edit first data corresponding to the first user-account and to edit second data corresponding to the second user-account. The method further includes editing the first data and the second data based on a multi-user login session that is detailed by the instructions. The multi-user login session is conducted on the second computing device and involves the first user-account and the second user-account being authenticated by the second computing device.

In yet another example, a non-transitory computer readable medium stores instructions that, when executed by a first computing device, cause the first computing device to perform functions. The functions include receiving, from a second computing device, a first user credential and a second user credential. The functions further include determining that the first user credential corresponds to a first user-account and that the second user credential corresponds to a second user-account. The functions further include, in response to determining that the first user credential corresponds to the first user-account and that the second user credential corresponds to the second user-account, sending, to the second computing device, an indication that the first user credential corresponds to the first user-account and that the second user credential corresponds to the second user-account. The functions further include receiving, from the second computing device, instructions to edit first data corresponding to the first user-account and to edit second data corresponding to the second user-account. The functions further include editing the first data and the second data based on a multi-user login session that is detailed by the instructions. The multi-user login session is conducted on the second computing device and involves the first user-account and the second user-account being authenticated by the second computing device.

In yet another example, a first computing device includes one or more processors and a non-transitory computer readable medium storing instructions that, when executed by the one or more processors, cause the first computing device to perform functions. The functions include receiving, from a second computing device, a first user credential and a second user credential. The functions further include determining that the first user credential corresponds to a first user-account and that the second user credential corresponds to a second user-account. The functions further include, in response to determining that the first user credential corresponds to the first user-account and that the second user credential corresponds to the second user-account, sending, to the second computing device, an indication that the first user credential corresponds to the first user-account and that the second user credential corresponds to the second user-account. The functions further include receiving, from the second computing device, instructions to edit first data corresponding to the first user-account and to edit second data corresponding to the second user-account. The functions further include editing the first data and the second data based on a multi-user login session that is detailed by the instructions. The multi-user login session is conducted on the second computing device and involves the first user-account and the second user-account being authenticated by the second computing device.

In yet another example, a first computing device is provided. The first computing device includes means for receiving, from a second computing device, a first user credential and a second user credential. The first computing device further includes means for determining that the first user credential corresponds to a first user-account and that the second user credential corresponds to a second user-account. The first computing device further includes means for, in response to determining that the first user credential corresponds to the first user-account and that the second user credential corresponds to the second user-account, sending, to the second computing device, an indication that the first user credential corresponds to the first user-account and that the second user credential corresponds to the second user-account. The first computing device further includes means for receiving, from the second computing device, instructions to edit first data corresponding to the first user-account and to edit second data corresponding to the second user-account. The first computing device further includes means for editing the first data and the second data based on a multi-user login session that is detailed by the instructions. The multi-user login session is conducted on the second computing device and involves the first user-account and the second user-account being authenticated by the second computing device.

In yet another example, a method includes receiving, by a first computing device, a first user credential and a second user credential. The method further includes sending, to a second computing device, the first user credential and the second user credential. The method further includes receiving, from the second computing device, an indication that the first user credential corresponds to a first user-account and that the second user credential corresponds to a second user-account. The method further includes receiving, from the second computing device, output data that is customized for both the first user-account and the second user-account based on analysis of first data and analysis of second data. The first data is access-protected via the first user credential and is associated with the first user-account and the second data is access-protected via the second user credential and is associated with the second user-account. The method further includes providing, via the user interface, output representing the output data.

In yet another example, a non-transitory computer readable medium stores instructions that, when executed by a first computing device, cause the first computing device to perform functions. The functions include receiving a first user credential and a second user credential. The functions further include sending, to a second computing device, the first user credential and the second user credential. The functions further include receiving, from the second computing device, an indication that the first user credential corresponds to a first user-account and that the second user credential corresponds to a second user-account. The functions further include receiving, from the second computing device, output data that is customized for both the first user-account and the second user-account based on analysis of first data and analysis of second data. The first data is access-protected via the first user credential and is associated with the first user-account and the second data is access-protected via the second user credential and is associated with the second user-account. The functions further include providing, via the user interface, output representing the output data.

In yet another example, a first computing device includes one or more processors and a non-transitory computer readable medium storing instructions that, when executed by the one or more processors, cause the first computing device to perform functions. The functions include receiving a first user credential and a second user credential. The functions further include sending, to a second computing device, the first user credential and the second user credential. The functions further include receiving, from the second computing device, an indication that the first user credential corresponds to a first user-account and that the second user credential corresponds to a second user-account. The functions further include receiving, from the second computing device, output data that is customized for both the first user-account and the second user-account based on analysis of first data and analysis of second data. The first data is access-protected via the first user credential and is associated with the first user-account and the second data is access-protected via the second user credential and is associated with the second user-account. The functions further include providing, via the user interface, output representing the output data.

In yet another example, a first computing device is provided. The first computing device includes means for receiving a first user credential and a second user credential. The first computing device further includes means for sending, to a second computing device, the first user credential and the second user credential. The first computing device further includes means for receiving, from the second computing device, an indication that the first user credential corresponds to a first user-account and that the second user credential corresponds to a second user-account. The first computing device further includes means for receiving, from the second computing device, output data that is customized for both the first user-account and the second user-account based on analysis of first data and analysis of second data. The first data is access-protected via the first user credential and is associated with the first user-account and the second data is access-protected via the second user credential and is associated with the second user-account. The first computing device further includes means for providing, via the user interface, output representing the output data.

In yet another example, a method includes receiving, by a first computing device, a first user credential and a second user credential. The method further includes sending, by the first computing device to a second computing device, the first user credential and the second user credential. The method further includes receiving, from the second computing device, an indication that the first user credential corresponds to a first user-account and that the second user credential corresponds to a second user-account. The method further includes sending, to the second computing device, instructions to edit first data and second data based on a multi-user login session that is conducted on the first computing device after receiving the indication. The multi-user login session is detailed by the instructions and the first data corresponds to the first user-account and the second data corresponds to the second user-account.

In yet another example, a non-transitory computer readable medium stores instructions that, when executed by a first computing device, cause the first computing device to perform functions. The functions include receiving a first user credential and a second user credential. The functions further include sending, to a second computing device, the first user credential and the second user credential. The functions further include receiving, from the second computing device, an indication that the first user credential corresponds to a first user-account and that the second user credential corresponds to a second user-account. The functions further include sending, to the second computing device, instructions to edit first data and second data based on a multi-user login session that is conducted on the first computing device after receiving the indication. The multi-user login session is detailed by the instructions and the first data corresponds to the first user-account and the second data corresponds to the second user-account.

In yet another example, a first computing device includes one or more processors and a non-transitory computer readable medium storing instructions that, when executed by the one or more processors, cause the first computing device to perform functions. The functions include receiving a first user credential and a second user credential. The functions further include sending, to a second computing device, the first user credential and the second user credential. The functions further include receiving, from the second computing device, an indication that the first user credential corresponds to a first user-account and that the second user credential corresponds to a second user-account. The functions further include sending, to the second computing device, instructions to edit first data and second data based on a multi-user login session that is conducted on the first computing device after receiving the indication. The multi-user login session is detailed by the instructions and the first data corresponds to the first user-account and the second data corresponds to the second user-account.

In yet another example, a first computing device is provided. The first computing device includes means for receiving a first user credential and a second user credential. The first computing device further includes means for sending, to a second computing device, the first user credential and the second user credential. The first computing device further includes means for receiving, from the second computing device, an indication that the first user credential corresponds to a first user-account and that the second user credential corresponds to a second user-account. The first computing device further includes means for sending, to the second computing device, instructions to edit first data and second data based on a multi-user login session that is conducted on the first computing device after receiving the indication. The multi-user login session is detailed by the instructions and the first data corresponds to the first user-account and the second data corresponds to the second user-account.

These as well as other aspects, advantages, and alternatives, will become apparent to those of ordinary skill in the art by reading the following detailed description, with reference where appropriate to the accompanying drawings.

DETAILED DESCRIPTION

Figure 1:
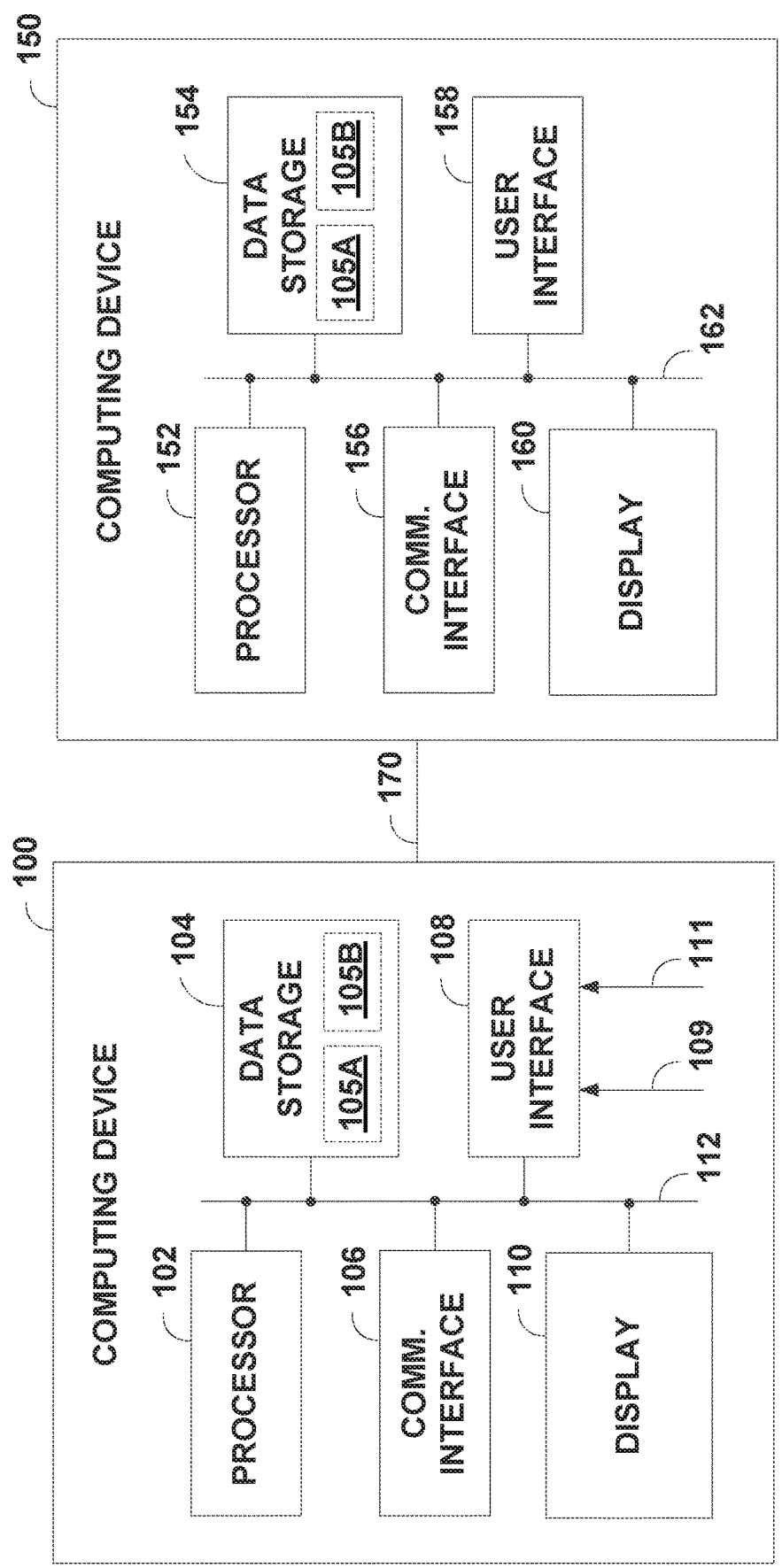
FIG. 1 depicts computing devices, according to an example embodiment.
Figure 2:
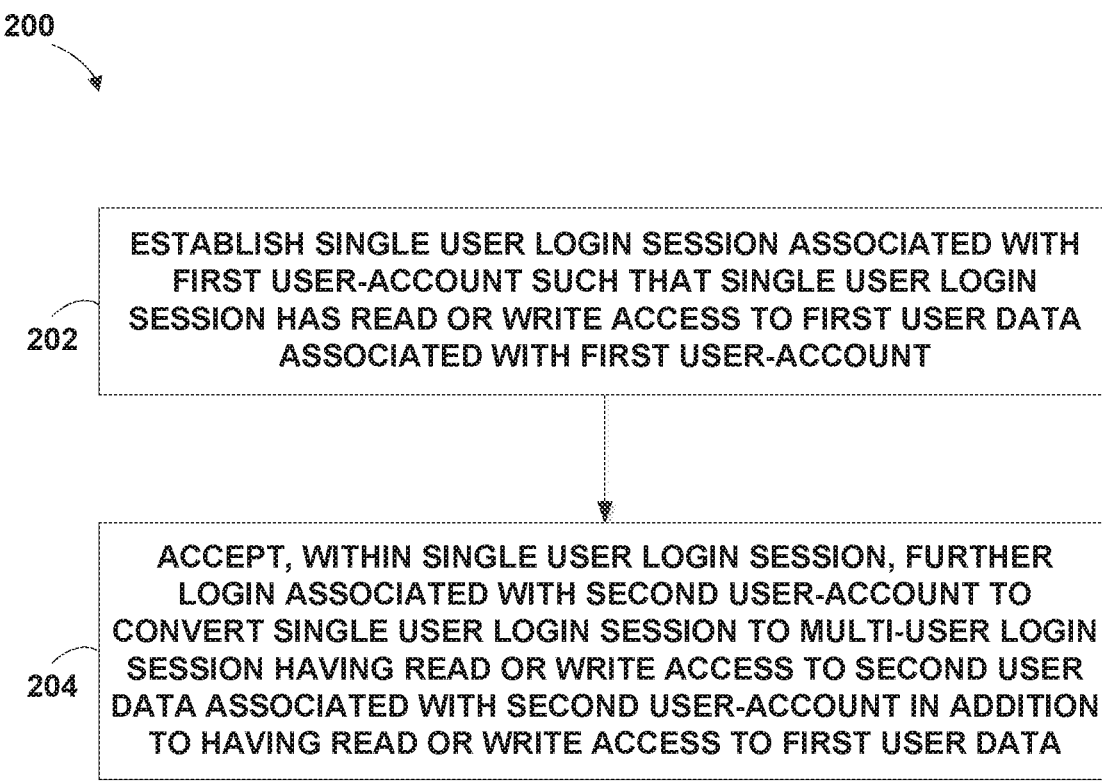
FIG. 2 is a block diagram of a method, according to an example embodiment.
Figure 3:
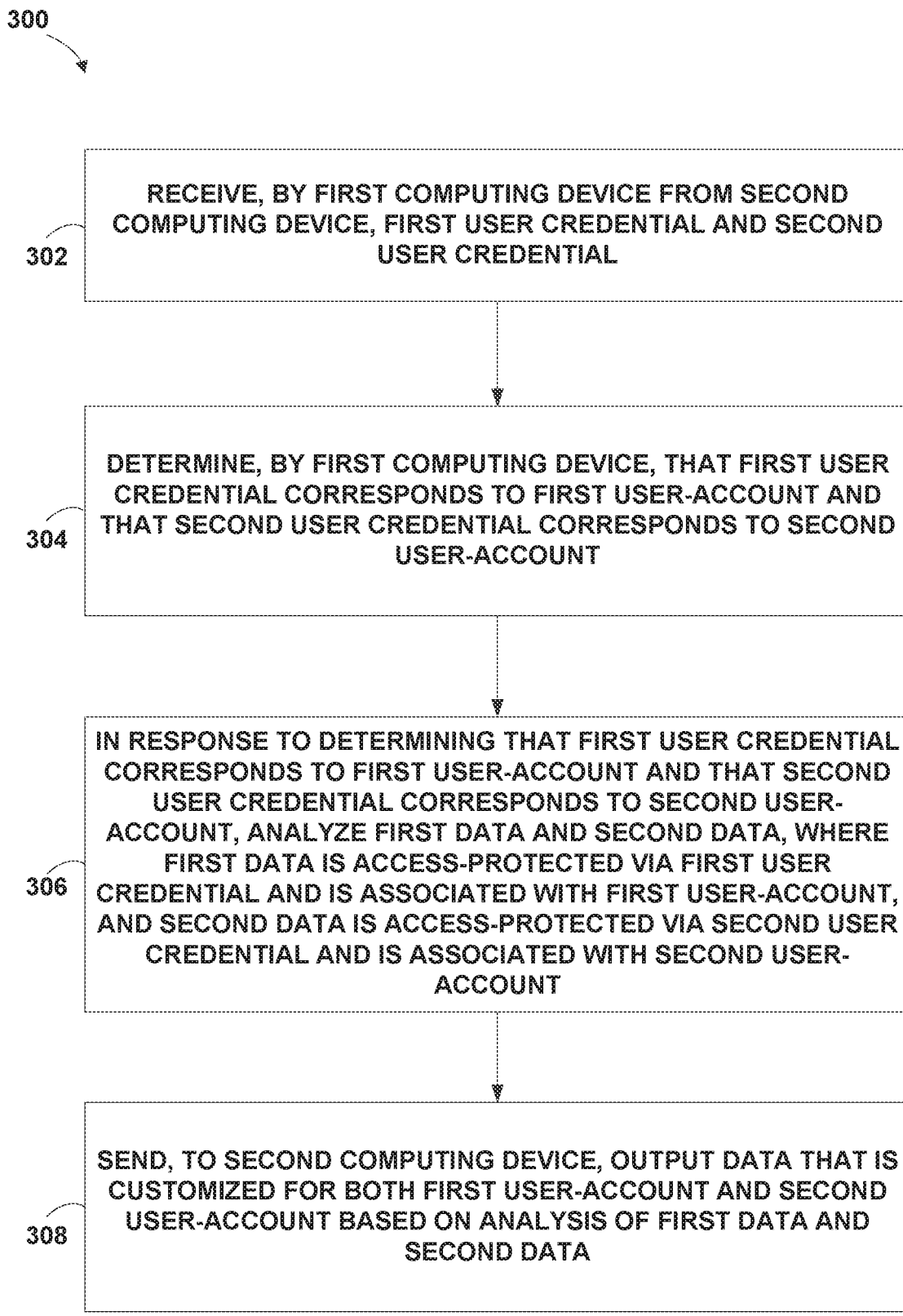
FIG. 3 is a block diagram of a method, according to an example embodiment.
Figure 4:
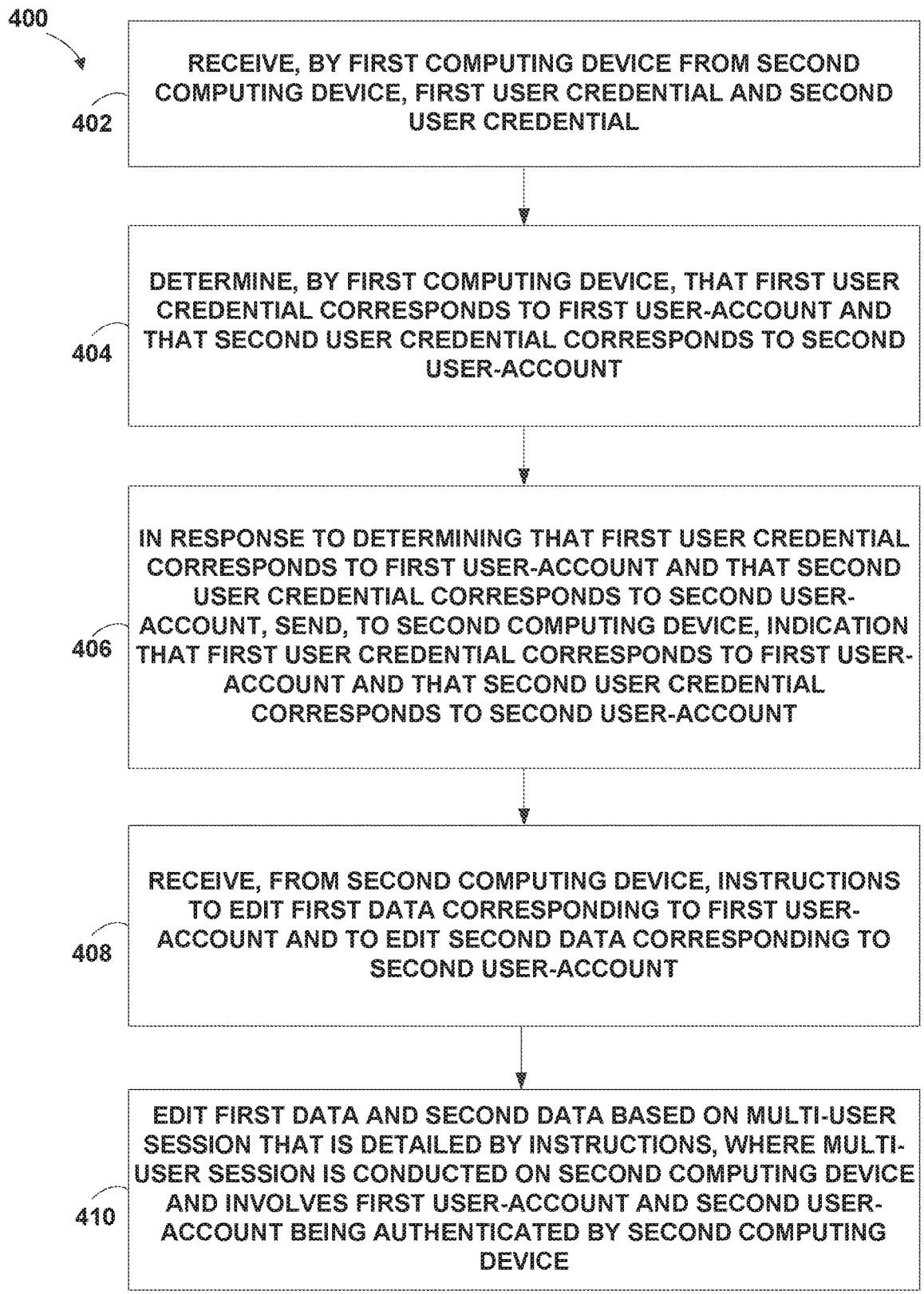
FIG. 4 is a block diagram of a method, according to an example embodiment.
Figure 5:
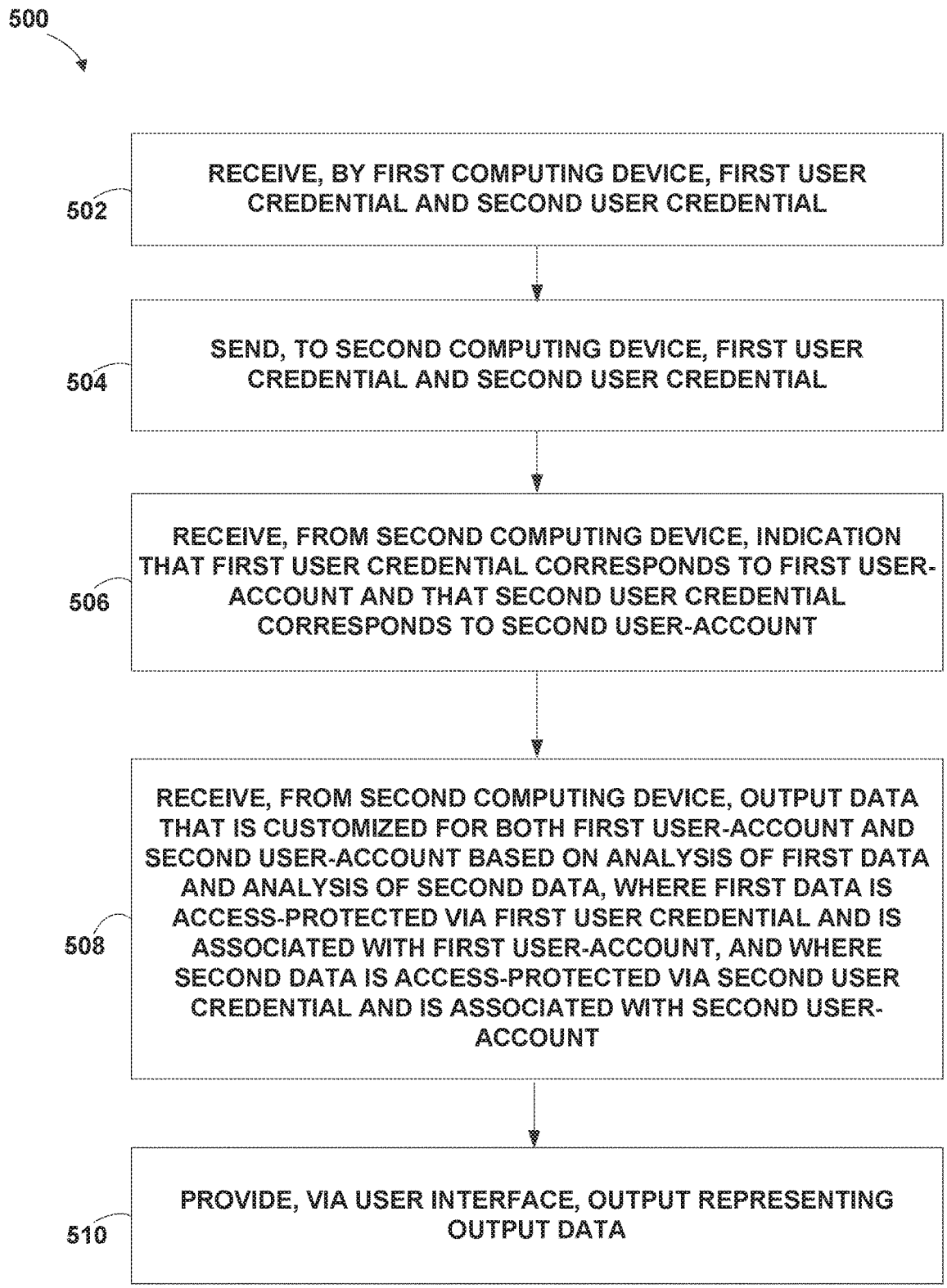
FIG. 5 is a block diagram of a method, according to an example embodiment.
Figure 6:
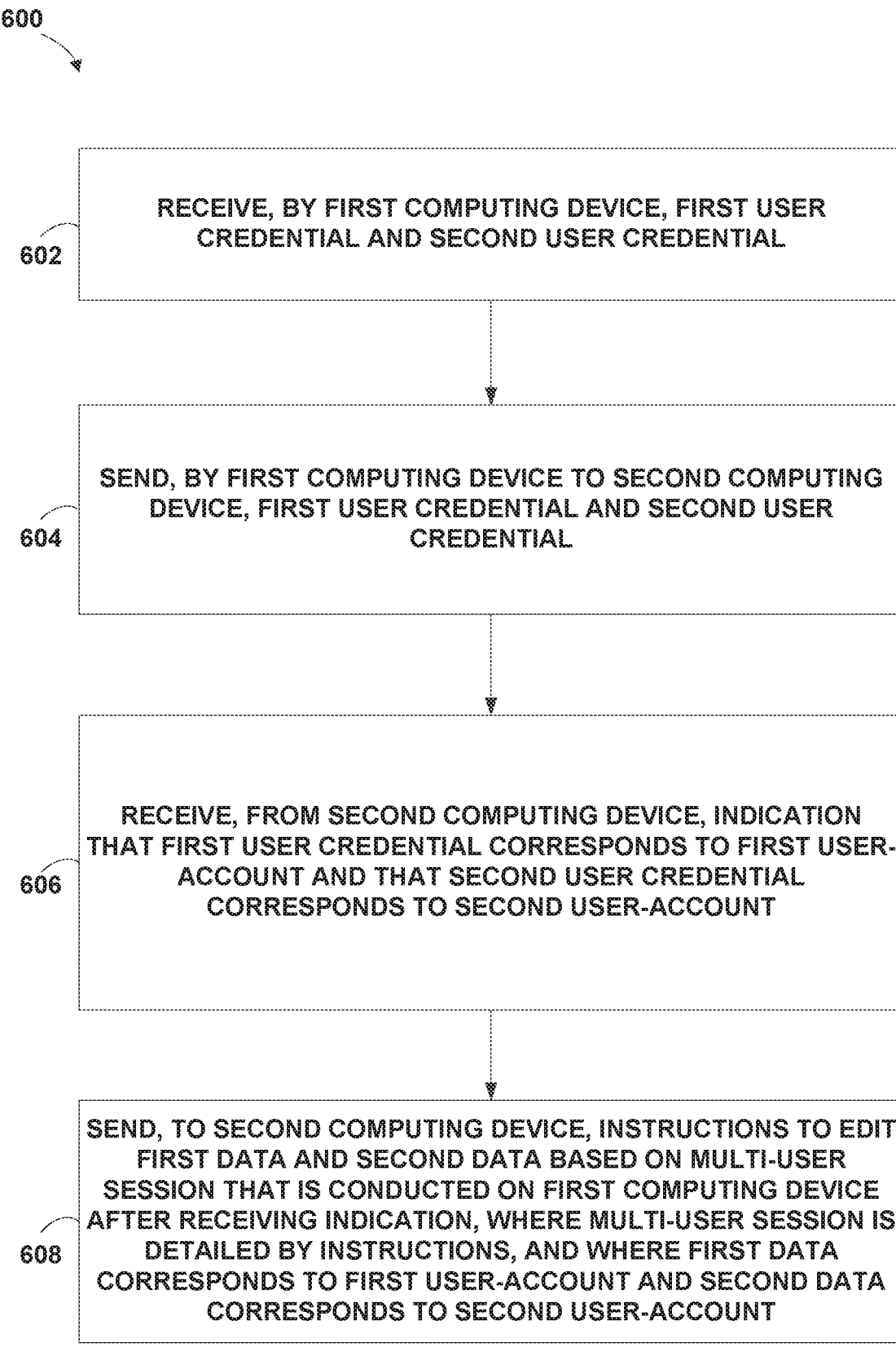
FIG. 6 is a block diagram of a method, according to an example embodiment.

Example methods and systems are described herein. Any example implementation or feature described herein is not necessarily to be construed as preferred or advantageous over other implementations or features. The example implementations described herein are not meant to be limiting. Certain aspects of the disclosed methods and systems can be arranged and combined in a wide variety of different configurations, all of which are contemplated herein.

Furthermore, the particular arrangements shown in the Figures should not be viewed as limiting. It should be understood that other embodiments might include more or fewer of each element shown in a given Figure. Further, some of the illustrated elements may be combined or omitted. Yet further, an example embodiment may include elements that are not illustrated in the Figures.

Operating systems, applications, and web services often provide user experiences that are customized on a per user basis. For example, a user may use user credentials (e.g., a username and a password) corresponding to a user-account to login to an operating system of a computing device. The operating system may then provide a graphical user interface and/or data access privileges that are customized for the user-account. For example, the user may find icons representing the user's files on a virtual "desktop." Furthermore, email, calendar, or contact management applications installed on the computing device may be configured to access, provide, and/or edit only data that is associated with the user-account.

Web services typically operate in a similar manner. For instance, the user may use a web browser to login to a web service and the web service may grant the user access to data that is curated by the web service (e.g., a server) and associated with the user-account. The web service may also edit the user's data based on the user's login session. For example, the user may login to a web browser on a friend's computer. Accordingly, a record of the web pages visited during the login session on the friend's computer may be added to the user's data that is stored by the server of the web service.

In some instances, it may be useful for two or more users to participate in a multi-user login session. For example, the two or more users may be conducting a joint research project and cooperatively using a single computing device to search for and review research literature. In this case, the two or more users might want web pages that are visited during the multi-user login session to be saved to the browser histories of two or more user-accounts respectively associated with the two or more users. In another example, a first user might be logged in to the web browser under a first user-account to place an online order for food delivery, but would like a second user to access credit card information that is stored as data associated with a second user-account to pay for the order. In such instances, it may be useful to provide a multi-user login session that allows for read and/or write access to multiple users' data.

Accordingly, a computing device may first establish a single-user login session associated with a first user-account such that the single-user login session has read and/or write access to first user data that is associated with the first user-account. In various examples, the computing device may authenticate the first user-account itself, or may pass first user credentials to a server for authentication. The first user data may be stored locally by the computing device and/or by the server. The computing device and/or the server may then accept, within the single-user login session, a further login associated with a second user-account to convert the single-user login session to a multi-user login session having read and/or write access to second user data associated with the second user-account in addition to having read and/or write access to the first user data.

During the multi-user login session, the computing device and/or the server may access, read, or write to data associated with the first user-account and data associated with the second user-account. For example, as a user operates the computing device during the multi-user login session, the user may be able to search emails, calendar entries, or browser histories associated with two or more user-accounts simultaneously, whether such data is stored locally by the computing device or is retrieved from the server.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

FIG. 1 is a simplified block diagram of example computing devices 100 and 150 that can perform various acts and/or functions, such as those described in this disclosure. The computing device 100 and the computing device 150 may each be any type of device that can receive and process data, and/or display information corresponding to or associated with the data. For example, the computing device 100 and the computing device 150 may each be a mobile phone, a tablet computer, a laptop computer, a desktop computer, a wearable computing device (e.g., in the form of a wrist band or a head-mountable device), or an in-car computer, among other possibilities.

In some examples, the computing device 100 may take the form of a "client device," such as a mobile phone, a tablet computer, a laptop computer, a desktop computer, a wearable computing device, and the computing device 150 may take the form of one or more servers or other networked computing devices.

The computing device 100 includes a processor 102, a data storage unit 104, a communication interface 106, a user interface 108, and a display 110. These components as well as other possible components can connect to each other (or to another device, system, or other entity) via a connection mechanism 112, which represents a mechanism that facilitates communication between two or more devices, systems, or other entities. As such, the connection mechanism 112 can be a simple mechanism, such as a cable or system bus, or a relatively complex mechanism, such as a packet-based communication network (e.g., the Internet). In some instances, a connection mechanism can include a non-tangible medium (e.g., where the connection is wireless).

The computing device 150 includes a processor 152, a data storage unit 154, a communication interface 156, a user interface 158, a display 160, and a connection mechanism 162, which may be respectively similar to the processor 102, the data storage unit 104, the communication interface 106, the user interface 108, the display 110, and the connection mechanism 112.

The computing device 150 may be communicatively coupled to the computing device 100 via a connection mechanism 170, which may include any kind of wired or wireless connection, a local area network, or a wide-area network etc.

The processor 102 may correspond to a general-purpose processor (e.g., a microprocessor) and/or a special-purpose processor (e.g., a digital signal processor (DSP)). In some instances, the computing device 100 may include more than one processor to perform functionality described herein.

The data storage unit 104 may include one or more volatile, non-volatile, removable, and/or non-removable storage components, such as magnetic, optical, or flash storage, and/or can be integrated in whole or in part with the processor 102. As such, the data storage unit 104 may take the form of a non-transitory computer-readable storage medium, having stored thereon program instructions (e.g., compiled or non-compiled program logic and/or machine code) that, when executed by the processor 102, cause the computing device 100 to perform one or more acts and/or functions, such as those described in this disclosure. Such program instructions can define and/or be part of a discrete software application. In some instances, the computing device 100 can execute program instructions in response to receiving an input, such as from the communication interface 106 and/or the user interface 108. The data storage unit 104 may also store other types of data, such as those types described in this disclosure.

The communication interface 106 can allow the computing device 100 to connect to and/or communicate with another other entity according to one or more communication protocols. The communication interface 106 can be a wired interface, such as an Ethernet interface or a high-definition serial-digital-interface (HD-SDI). The communication interface 106 can additionally or alternatively include a wireless interface, such as a cellular or WI-FI interface. A connection provided by the communication interface 106 can be a direct connection or an indirect connection, the latter being a connection that passes through and/or traverses one or more entities, such as such as a router, switcher, or other network device. Likewise, a transmission to or from the communication interface 106 can be a direct transmission or an indirect transmission.

The user interface 108 can facilitate interaction between the computing device 100 and a user of the computing device 100, if applicable. As such, the user interface 108 can include input components such as a keyboard, a keypad, a mouse, a touch sensitive and/or presence sensitive pad or display, a microphone, a camera, and/or output components such as a display device (which, for example, can be combined with a touch sensitive and/or presence sensitive panel), a speaker, and/or a haptic feedback system. More generally, the user interface 108 can include any hardware and/or software components that facilitate interaction between the computing device 100 and the user of the computing device 100.

In a further aspect, the computing device 100 includes the display 110. The display 110 may be any type of graphic display. As such, the display 110 may vary in size, shape, and/or resolution. Further, the display 110 may be a color display or a monochrome display.

As indicated above, the connection mechanism 112 may connect components of the computing device 100. The connection mechanism 112 is illustrated as a wired connection, but wireless connections may also be used in some implementations. For example, the communication mechanism 112 may be a wired serial bus such as a universal serial bus or a parallel bus. A wired connection may be a proprietary connection as well. Likewise, the communication mechanism 112 may also be a wireless connection using, e.g., Bluetooth® radio technology, communication protocols described in IEEE 802.11 (including any IEEE 802.11 revisions), cellular technology (such as GSM, CDMA, UMTS, EV-DO, WiMAX, or LTE), or Zigbee® technology, among other possibilities.

Methods 200-600 depicted in FIGS. 2-6 present example methods that can be performed by the computing device 100 and/or the computing device 150. In other examples, the methods 200-600 may be performed by any combination of one or more suitable components described herein. FIGS. 2-6 may include one or more operations, functions, or actions as illustrated by one or more of blocks 202, 204, 302, 304, 306, 308, 402, 404, 406, 408, 410, 502, 504, 506, 508, 510, 602, 604, 606, and 608. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the methods 200-600, and other processes and methods disclosed herein, the flowcharts show functionality and operation of one possible implementation of present embodiments. In this regard, each block may represent a module, a segment, or a portion of program code, which includes one or more instructions executable by a processor for implementing specific logical functions or steps in a process. The program code may be stored on any type of computer readable medium, for example, such as a storage device including a disk or hard drive. The computer readable medium may include a non-transitory computer readable medium, for example, such as computer readable media that stores data for short periods of time like register memory, processor cache, or Random Access Memory (RAM). The computer readable medium may also include non-transitory media, such as secondary or persistent long term storage, like read-only memory (ROM), optical or magnetic disks, or compact-disc read-only memory (CD-ROM), for example. The computer readable media may also be any other volatile or non-volatile storage system. The computer readable medium may be considered a computer readable storage medium, a tangible storage device, or other article of manufacture, for example.

In addition, for the methods 200-600, and other processes and methods disclosed herein, each block in FIGS. 2-6 may represent circuitry that is wired to perform the specific logical functions in the process. For example, one or more field-programmable gate arrays (FPGA) and/or one or more application-specific integrated circuits (ASIC) might be configured to perform the method 400 and/or other processes and methods disclosed herein.

At block 202, the method 200 includes establishing a single-user login session associated with a first user-account such that the single-user login session has read and/or write access to first user data associated with the first user-account.

For instance, the computing device 100 may receive, via the user interface 108, input representing a user credential 109 associated with the first user-account. Alternatively, the computing device 100 might receive the user credential 109 from another computing device (not shown), e.g., via near-field communication (NFC), Bluetooth, or other wired or wireless communication protocols. In one example, the user credential 109 may include a username, an email address, a password, a personal identification number (PIN), and/or a fingerprint. Other forms of user credentials are possible as well.

In some examples, the computing device 100 may authenticate the first user-account without interacting with the computing device 150. For instance, the computing device 100 may compare the user credential 109 with a user credential stored by the data storage unit 104, e.g., within user data 105A. The user credential included within the user data 105A may be known to correspond to the first user-account. After confirming that the user credential 109 matches the user credential stored within the user data 105A, the computing device 100 may provide a notification, via the user interface 108, that the first user-account has been authenticated.

During the single-user login session, the computing device 100 may operate with privileges to read and/or write to the data 105A. The data 105A may include user preferences, contact list information, emails, an internet browsing history, a geolocation history, and/or a history of interaction with various (e.g., internet) advertisements associated with the first user-account, as described in more detail below. The read access to the data 105A may include the ability to read the data 105A and use the data 105A directly or indirectly to provide output via the user interface 108. The write access to the data 105A may include the ability to edit the data 105A based on events that take place or input provided during the single-user login session.

In another example, the computing device 150 may authenticate the first user-account instead of the computing device 100. For example, the computing device 100 may send the user credential 109 to the computing device 150 for authentication. In this example, the data 105A may be stored at the data storage unit 154 of the computing device 150. After confirming that the user credential 109 matches the user credential stored within the user data 105A, the computing device 150 may provide a notification, via the communication interface 156 to the computing device 100, that the first user-account has been authenticated. The computing device 100 may then provide a notification, via the user interface 108, that the first user-account has been authenticated.

At block 204, the method 200 includes accepting, within the single-user login session, a further login associated with a second user-account to convert the single-user login session to a multi-user login session having read and/or write access to second user data associated with the second user-account in addition to having read and/or write access to the first user data.

In some examples, block 204 may involve accepting multiple additional logins associated respectively with one or more additional user-accounts to convert the single-user login session to a multi-user login session having read and/or write access to data associated respectively with the one or more additional user-accounts. After some time, the one or more additional user accounts might log off the multi-user login session to revert back to a single-user login session.

For instance, the computing device 100 may receive, via the user interface 108, input representing a user credential 111 associated with the second user-account. Alternatively, the computing device 100 might receive the user credential 111 from a third computing device (not shown), e.g., via near-field communication (NFC), Bluetooth, or other wired or wireless communication protocols. In one example, the user credential 111 may include a username, an email address, a password, a personal identification number (PIN), and/or a fingerprint. Other forms of user credentials are possible as well.

In some examples, the computing device 100 may authenticate the second user-account without interacting with the computing device 150. For instance, the computing device 100 may compare the user credential 111 with a user credential stored by the data storage unit 104, e.g., within user data 105B. The user credential included within the user data 105B may be known to correspond to the second user-account. After confirming that the user credential 111 matches the user credential stored within the user data 105B, the computing device 100 may provide a notification, via the user interface 108, that the second user-account has been authenticated.

During the multi-user login session, the computing device 100 may operate with privileges to read and/or write to the data 105A and/or the data 105B. The data 105B may include user preferences, contact list information, emails, an internet browsing history, a geolocation history, and/or a history of interaction with various (e.g., internet) advertisements associated with the second user-account, as described in more detail below. The read access to the data 105B may include the ability to read the data 105B and use the data 105B directly or indirectly to provide output via the user interface 108. The write access to the data 105B may include the ability to edit the data 105B based on events that take place or input received during the multi-user login session.

In another example, the computing device 150 may authenticate the second user-account instead of the computing device 100. For example, the computing device 100 may send the user credential 111 to the computing device 150 for authentication. In this example, the data 105B may be stored at the data storage unit 154 of the computing device 150. After confirming that the user credential 111 matches the user credential stored within the user data 105B, the computing device 150 may provide a notification, via the communication interface 156 to the computing device 100, that the second user-account has been authenticated. The computing device 100 may then provide a notification, via the user interface 108, that the second user-account has been authenticated.

In the above examples, the single-user login session and the multi-user login session may both be provided by an operating system of the computing device 100 (e.g., in cases where the data 105A and the data 105B are stored by the data storage unit 104 but are not also stored by the data storage unit 154).

Whether the computing device 100 provides the multi-user login session with or without the computing device 150, various examples may include the computing device 100 providing a graphical user interface for the multi-user login session and reading the data 105B or writing to the data 105B based on input received via the graphical user interface, as described in more detail below.

In some examples, the computing device 100 and/or the computing device 150 may execute, in the multi-user login session, a software application for which both the data 105A and the data 105B are applicable. For example, the computing device 100 and/or the computing device 150 may execute the software application to display both the data 105A and the data 105B. By further example, the computing device 100 and/or the computing device 150 may execute the software application to update both the data 105A and the data 105B with data generated by execution of the application in the multi-user login session and/or user input received during the multi-user login session.

In some examples, the method 200 may involve the use of "OAuth," "OpenID," or similar protocols for allowing a third-party network access to user data stored at data storage 104 or data storage 154.

At block 302, the method 300 includes receiving, by a first computing device from a second computing device, a first user credential and a second user credential. For example, the computing device 150 may receive the user credential 109 and the user credential 111 from the computing device 100. In some examples, block 302 may involve receiving user credentials corresponding respectively to three or more user-accounts.

At block 304, the method 300 includes determining, by the first computing device, that the first user credential corresponds to a first user-account and that the second user credential corresponds to a second user-account. In some examples, block 304 may involve determining that three or more user credentials correspond respectively to three or more user-accounts.

For example, the computing device 150 may determine that the user credential 109 corresponds to the first user-account and determine that the user credential 111 corresponds to the second user-account. More specifically, the computing device 150 may determine that the user credential 109 matches a user credential stored at data 105A at the data storage unit 154. Additionally, the computing device 150 may determine that the user credential 111 matches a user credential stored at data 105B at the data storage unit 154.

At block 306, the method 300 includes, in response to determining that the first user credential corresponds to the first user-account and that the second user credential corresponds to the second user-account, analyzing first data and second data. In this context, the first data is access-protected via the first user credential and is associated with the first user-account, and the second data is access-protected via the second user credential and is associated with the second user-account. In some examples, block 306 may involve analyzing data corresponding respectively to three or more user-accounts.

For example, the computing device 150 may analyze the data 105A and the data 105B stored at the data storage unit 154. Various specific examples are described below, but generally the computing device 150 will analyze the data 105A and the data 105B to facilitate a user experience that is customized for both the first user-account and the second user-account during a multi-user login session.

At block 308, the method 300 includes sending, to the second computing device, output data that is customized for both the first user-account and the second user-account based on the analysis of the first data and the second data. In some examples, block 308 may involve sending output data that is customized for three or more user-accounts. After some time, the one or more secondary user accounts might log off the multi-user login session to revert back to a single-user login session.

As such, the computing device 150 may send output data to the computing device 100. The output data may reflect the analysis of the data 105A and the data 105B performed (e.g., by the computing device 150) at block 306.

Figure 7:
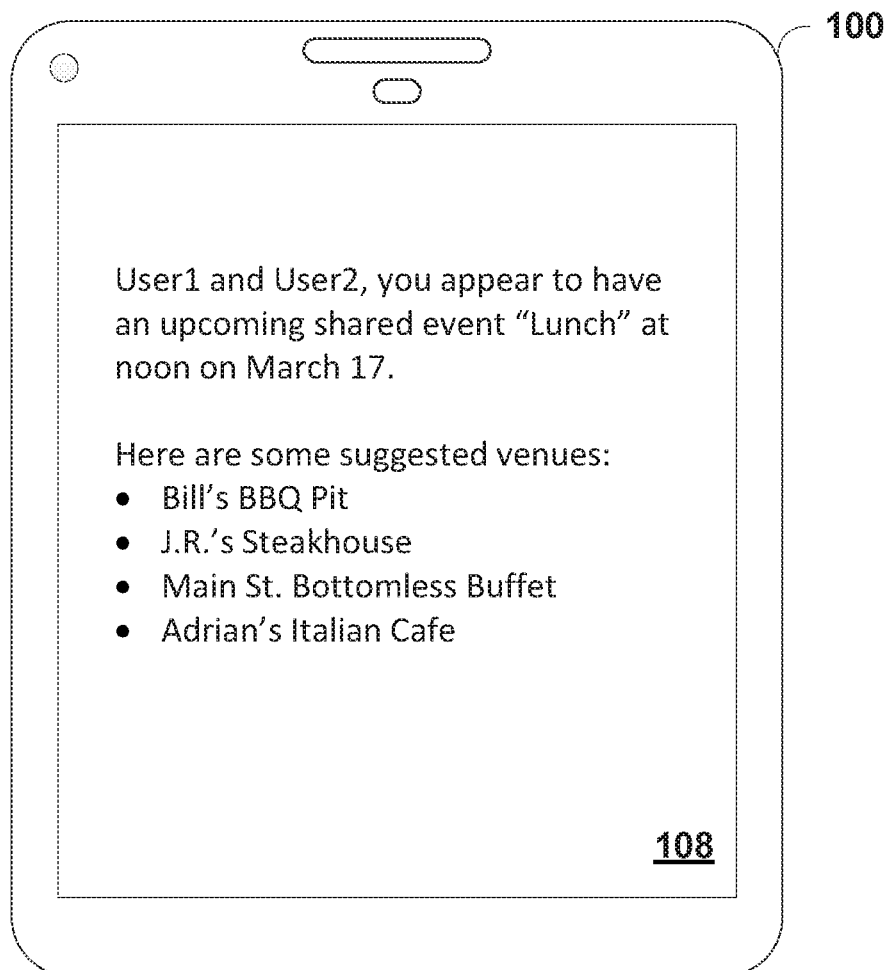
FIG. 7 shows a graphical user interface provided by a computing device, according to an example embodiment.

In one example, the data 105A may include first calendar data and one or more first user preferences that are associated with the first user-account. Additionally, the data 105B may include second calendar data and one or more second user preferences that are associated with the second user-account. In this context, the computing device 150 analyzing the data 105A and the data 105B may include the computing device 150 determining that the first calendar data and the second calendar data share a calendar entry (e.g., calendar entries having a common title, start time, end time, invitees, etc.), and the computing device 150 analyzing the one or more first user preferences and the one or more second user preferences. In this context, the output data sent by the computing device 150 to the computing device 100 may include a suggested venue for the shared calendar entry. For example, the shared calendar entry may be a lunch meeting. By analyzing the user preferences associated respectively with the first user-account and the second user-account, the computing device 150 may determine that respective users associated with the first user-account and the second user-account may have both expressed interest in barbeque, steak, buffets, and Italian food. Accordingly, the computing device 150 may send output data including suggestions that the lunch meeting take place at "Bill's BBQ Pit," "J.R.'s Steakhouse," "Main St. Bottomless Buffet," or "Adrian's Italian Cafe," as shown in FIG. 7. FIG. 7 depicts the user interface 108 of the computing device 100 displaying such output data after receiving the output data from the computing device 150.

Figure 8:
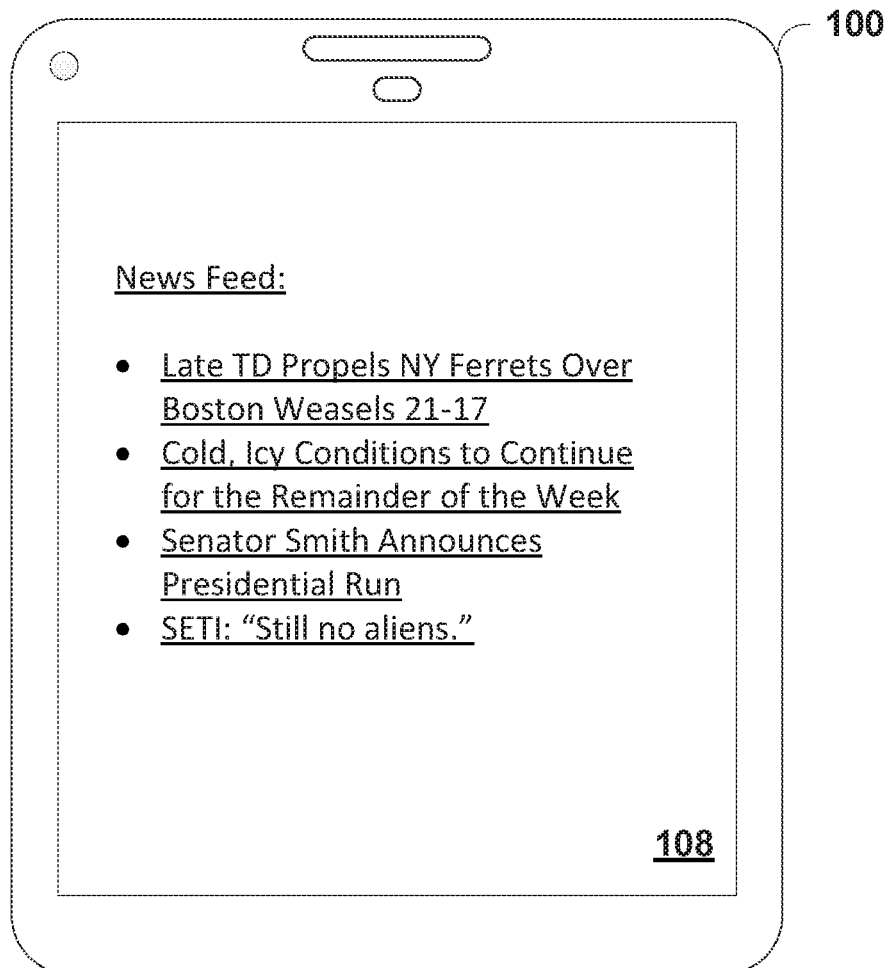
FIG. 8 shows a graphical user interface provided by a computing device, according to an example embodiment.

In another example, the data 105A may include one or more first user preferences that are associated with the first user-account. Additionally, the data 105B may include one or more second user preferences that are associated with the second user-account. In this context, the computing device 150 analyzing the data 105A and the data 105B may include the computing device 150 analyzing the one or more first user preferences and the one or more second user preferences. The output data sent by the computing device 150 to the computing device 100 may include a news feed that includes one or more media items that are each associated with the one or more first user preferences and the one or more second user preferences. By analyzing the user preferences associated respectively with the first user-account and the second user-account, the computing device 150 may determine that respective users associated with the first user-account and the second user-account may have both expressed interest in sports, weather, politics, and astronomy. Accordingly, the computing device 150 may send output data including links to news articles respectively headlined "Late TD Propels NY Ferrets Over Boston Weasels 21-17," "Cold, Icy Conditions to Continue for the Remainder of the Week," "Senator Smith Announces Presidential Run," and "SETI: 'Still no aliens,'" as shown in FIG. 8. FIG. 8 depicts the user interface 108 of the computing device 100 displaying such output data after receiving the output data from the computing device 150.

Figure 9:
FIG. 9 shows a graphical user interface provided by a computing device, according to an example embodiment.

In yet another example, the one or more user preferences associated with the first user-account may include a first contact or "friend" list and the one or more second user preferences associated with the second user-account may include a second contact or "friend" list. In this context, the one or more media items (e.g., social media "posts") of the news feed are each associated with a user-account that is included in both the first contact list and in the second contact list. Accordingly, the computing device 150 may send output data including posts respectively associated with "Friend 1," "Friend 2," "Friend 3," and "Friend 4," as shown in FIG. 9. FIG. 9 depicts the user interface 108 of the computing device 100 displaying such output data after receiving the output data from the computing device 150.

Figure 10:
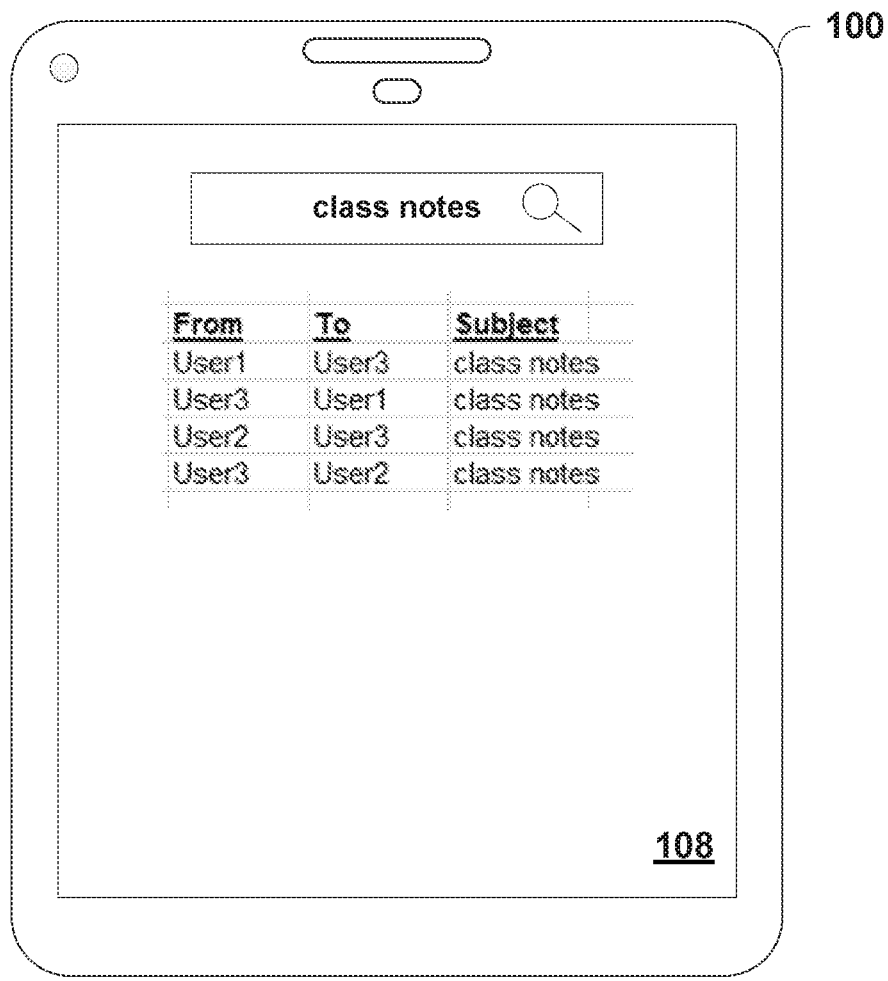
FIG. 10 shows a graphical user interface provided by a computing device, according to an example embodiment.

In another example, the computing device 150 may receive a search string from the computing device 100. In this context, the search string may be entered via the user interface 108 and thereafter sent to the computing device 150 by the computing device 100. Referring to FIG. 10, for example, the search string may include the phrase "class notes." Furthermore, the data 105A may include one or more first emails that are associated with the first user-account and the data 105B may include one or more second emails that are associated with the second user-account. In this context, the computing device 150 analyzing the data 105A and the data 105B may include analyzing the one or more first emails and the one or more second emails. Accordingly, the output data may include at least one email from the one or more first emails or the one or more second emails such that the at least one email contains the search string. As such, the computing device 150 may send output data including emails associated with the first user-account and/or emails associated with the second user-account that contain the string "class notes" as shown in FIG. 10. FIG. 10 depicts the user interface 108 of the computing device 100 displaying such output data after receiving the output data from the computing device 150.

Figure 11:
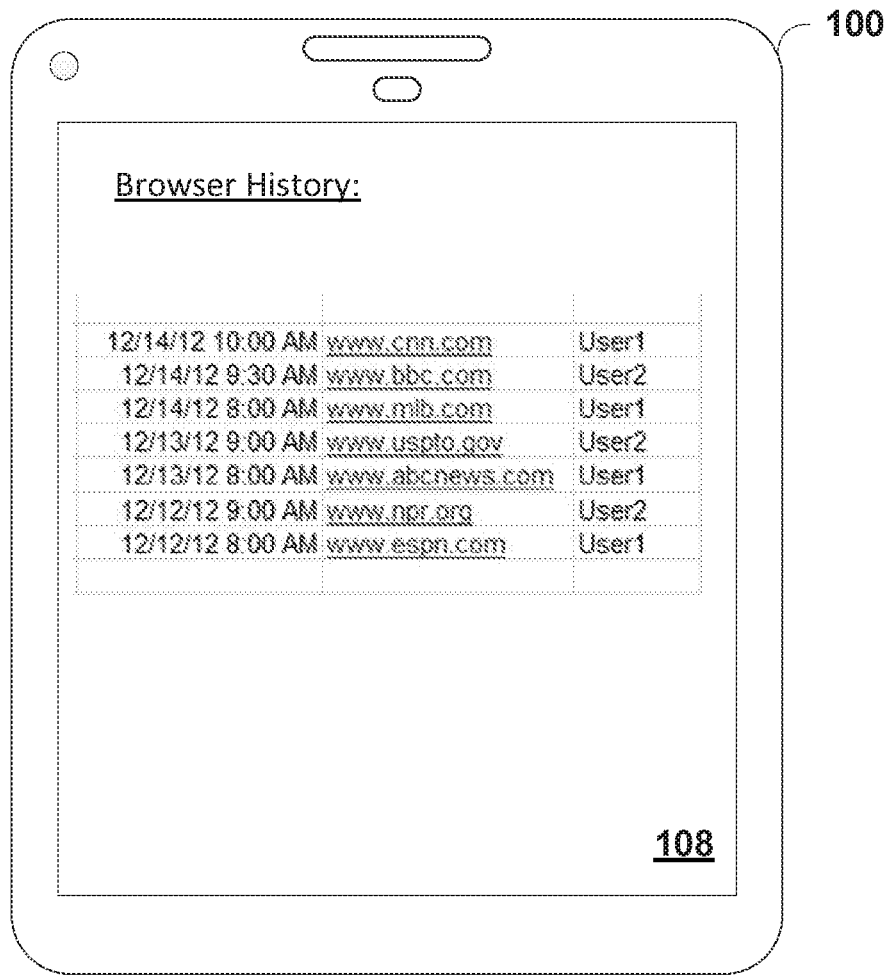
FIG. 11 shows a graphical user interface provided by a computing device, according to an example embodiment.

In yet another example, the data 105A may include an internet browsing history that is associated with the first user-account and the data 105B may include an internet browsing history that is associated with the second user-account. For example, the data 105A may include web addresses corresponding to web pages visited during one or more login sessions corresponding to the first user-account and dates and times during which the respective web pages were visited. In this context, the computing device 150 analyzing the data 105A and the data 105B may include accessing the internet browsing histories associated respectively with the first user-account and the second user-account. Accordingly, the output data may include a combined internet browsing history that includes at least a portion of the browsing history associated with the first user-account and at least a portion of the browsing history associated with the second user-account. FIG. 11 depicts the user interface 108 of the computing device 100 displaying such output data after receiving the output data from the computing device 150.

In some examples, the computing device 150 may receive, from the computing device 100, a request to send the output data. The request may include a message indicating that the output data is allowed to include particular portions of the data 105B, but not other portions of the data 105B. For example, the computing device 150 might be allowed to send calendar data and email data, but not browser history data, in accordance with the message. In this way, the multi-user login session may operate with limited and/or user-defined data access privileges with respect to the second user-account, such that only particular information associated with the second user-account is accessible to a multi-user login session conducted on the computing device 100.

In various examples, the computing device 150 may determine that a predetermined amount of time (e.g., 30 minutes) passed since receiving the user credential 111 from the computing device 100. After determining that the predetermined amount of time passed, the computing device 150 may receive, from the computing device 100, a request to send additional output data that is customized for both the first user-account and the second user-account. Based on determining that the predetermined amount of time passed and based on receiving the request to send additional output data, the computing device 150 may send, to the computing device 100, a request for the computing device 100 to reacquire a user credential (e.g., the user credential 111) that corresponds to the second user-account. In this way, the computing devices 100 and 150 may confirm that a user corresponding to the second user-account is still actively participating in the multi-user login session on the computing device 100 and that the data 105B should continue to be used for the multi-user login session. As such, the computing device 150 may receive, from the computing device 100, the requested user credential and, in response to receiving the requested user credential, send the additional output data. This process of reconfirming account authorization periodically may also be performed in conjunction with the method 400 described below.

In some examples, the computing device 150 may receive, from a third computing device (not shown), a request that information that is access-protected via the second user credential and/or the second user-account no longer be communicated between the computing device 150 and the computing device 100. In such an example, the third computing device may be associated with the second user-account and/or signed into the computing device 150 with the second user-account. Next, the computing device 150 may send, to the computing device 100, a notification that information that is access-protected via the second user credential and/or the second user-account is no longer to be communicated between the computing device 100 and the computing device 150. In this way, a user may use a third computing device to end the multi-user login session. This process of ending the multi-user login session via a third computing device may also be performed in conjunction with the method 400 described below.

Figure 12:
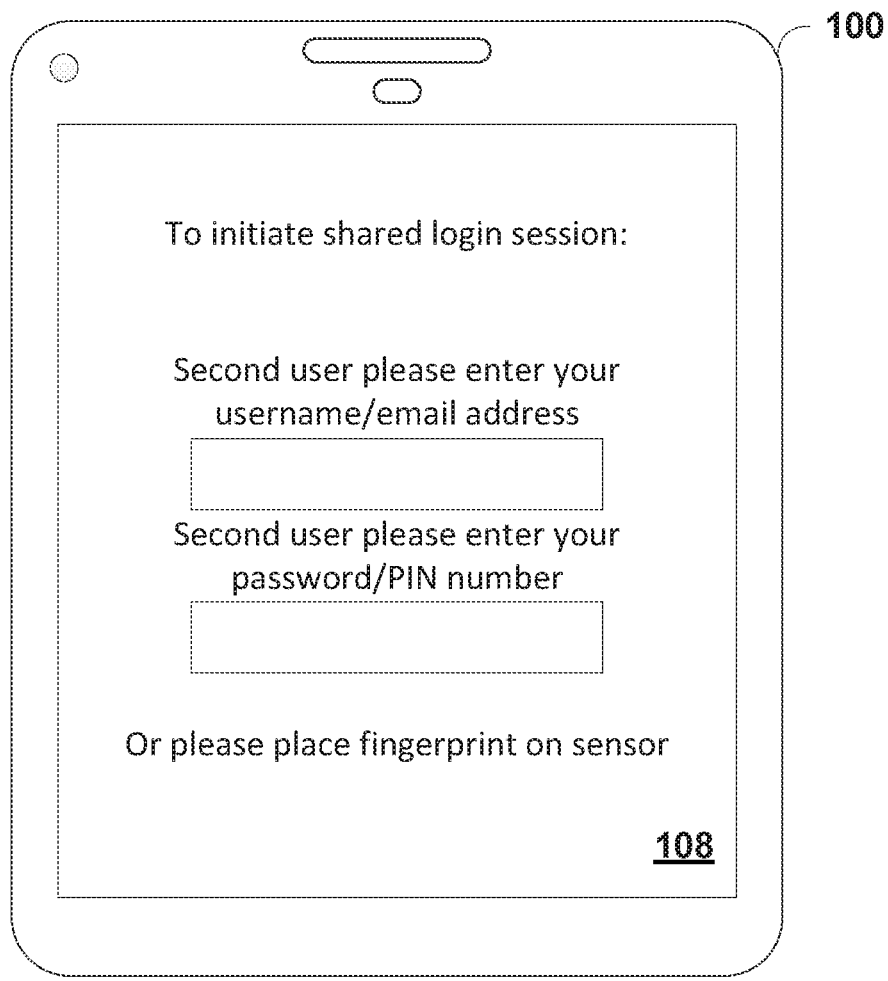
FIG. 12 shows a graphical user interface provided by a computing device, according to an example embodiment.

In another example, the computing device 150 may receive, from the third computing device (not shown), location data indicating a location of the third computing device. In response to determining that the third computing device is within a threshold distance of the computing device 150, the computing device 150 may send, to the computing device 100, an instruction to provide, via the user interface 108, output requesting the second user credential. FIG. 12 depicts the user interface 108 of the computing device 100 displaying such a request for a user to provide the second user credential for authenticating the second user-account. In this way, the computing devices 100 and 150 may collaborate to "intelligently" suggest a multi-user login session based on close proximity between the third computing device that is associated with the second user-account and the computing device 100. This process of suggesting the multi-user login session via proximity of a third computing device may also be performed in conjunction with the method 400 described below.

In a similar manner, the computing device 150 may receive, from the third computing device, updated location data indicating an updated location of the third computing device. The computing device 150 may use the updated location data to determine that the updated location of the third computing device is greater than a threshold distance away from the computing device 100. Accordingly, the computing device 150 may send, to the computing device 100, a notification that information that is access-protected via the second user credential is no longer to be communicated between the computing device 150 and the computing device 100. In this way, the computing devices 100 and 150 may collaborate to "intelligently" end the multi-user login session based on an inference that the user associated with the second user-account is no longer in proximity to the computing device 100. This process of ending the multi-user login session based on a lack of proximity of a third computing device may also be performed in conjunction with the method 400 described below.

In yet another example, the computing device 150 may determine that the first user-account has conducted a past multi-user login session on a shared device with the second user-account, perhaps by accessing the data 105A and/or the data 105B. As such, the computing device 150 may send the instruction to provide the output requesting the second user credential additionally in response to determining that the first user-account has conducted the past multi-user login session on the shared device with the second user-account. That is, the computing devices 100 and 150 may collaborate to suggest the multi-user login session additionally based on the first user-account and the second user-account engaging in a previous multi-user login session. This process of suggesting the multi-user login session based on a past multi-user login session may also be performed in conjunction with the method 400 described below.

In another example, the computing device 150 may determine that the second user-account appears on a contact list of the first user-account. For example, the second user-account may appear within a contact list stored at the data storage unit 154 within the data 105A. As such, the computing device 150 may send the instruction to provide the output requesting the second user credential additionally in response to determining that the second user-account appears on the contact list of the first user-account. That is, the computing devices 100 and 150 may collaborate to suggest the multi-user login session additionally based on the second user-account being on a contact list of the first user-account. This process of suggesting the multi-user login session via contact list matching may also be performed in conjunction with the method 400 described below.

In some examples, the method 300 may involve the use of "OAuth," "OpenID," or similar protocols for allowing a third-party network access to user data stored at data storage 104 or data storage 154.

At block 402, the method 400 includes receiving, by a first computing device from a second computing device, a first user credential and a second user credential. In some examples, block 402 may involve receiving user credentials corresponding respectively to three or more user-accounts. For example, the computing device 150 may receive the user credential 109 and the user credential 111 from the computing device 100.

At block 404, the method 400 includes determining, by the first computing device, that the first user credential corresponds to a first user-account and that the second user credential corresponds to a second user-account. In some examples, block 404 may involve determining that three or more user credentials correspond respectively to three or more user-accounts.

For example, the computing device 150 may determine that the user credential 109 corresponds to the first user-account and determine that the user credential 111 corresponds to the second user-account. More specifically, the computing device 150 may determine that the user credential 109 matches a user credential stored at data 105A at the data storage unit 154. Additionally, the computing device 150 may determine that the user credential 111 matches a user credential stored at data 105B at the data storage unit 154.

At block 406, the method 400 includes, in response to determining that the first user credential corresponds to the first user-account and that the second user credential corresponds to the second user-account, sending, to the second computing device, an indication that the first user credential corresponds to the first user-account and that the second user credential corresponds to the second user-account. In some examples, block 406 involves sending indications that three or more user credentials correspond respectively to three or more user-accounts.

For example, the computing device 150 may determine that the user credential 109 corresponds to the first user-account and that the user credential 111 corresponds to the second user-account. The computing device 150 may then send, to the computing device 100, an indication that the user credential 109 corresponds to the first user-account and that the user credential 111 corresponds to the second user-account.

At block 408, the method 400 includes receiving, from the second computing device, instructions to edit first data corresponding to the first user-account and to edit second data corresponding to the second user-account. In some examples, block 408 may involve receiving instructions to edit data corresponding respectively to three or more user-accounts.

For example, the computing device 150 may receive, from the computing device 100, instructions to edit the data 105A stored at the data storage unit 154 and the data 105B stored at the data storage unit 154. In some examples, block 408 may involve receiving instructions to edit data corresponding respectively to three or more user-accounts.

At block 410, the method 400 includes editing the first data and the second data based on a multi-user login session that is detailed by the instructions. In this context, the multi-user login session is conducted on the second computing device and involves the first user-account and the second user-account being authenticated by the second computing device. For example, the computing device 150 may edit the data 105A stored at the data storage unit 154 and/or the data 105B stored at the data storage unit 154 based on instructions received from the computing device 100, as described in more detail below. In some examples, block 410 may involve editing data corresponding respectively to three or more user-accounts based on a multi-user login session that is detailed by the instructions received at block 408. After some time, the one or more additional user accounts might log off the multi-user login session to revert back to a single-user login session.

In some examples, the data 105A may include a first advertisement interaction history corresponding to the first user-account and the data 105B may include a second advertisement interaction history corresponding to the second user-account. For instance, the first advertisement interaction history may include data identifying advertisements that have been displayed or provided during a login session corresponding to the first user-account. The first advertisement interaction history may further indicate whether the first user-account interacted with (e.g., clicked on) each of the advertisements. The second advertisement interaction history may include data identifying advertisements that have been displayed or provided during a login session corresponding to the second user-account. The second advertisement interaction history may further indicate whether the second user-account interacted with (e.g., clicked on) each of the advertisements. The instructions received by the computing device 150 from the computing device 100 may include instructions to edit the first advertisement interaction history to indicate that the first user-account did (or did not) interact with a particular advertisement provided by the computing device 100 during the multi-user login session and instructions to edit the second advertisement interaction history to indicate that the second user-account did (or did not) interact with the particular advertisement during the multi-user login session.

Figure 13:
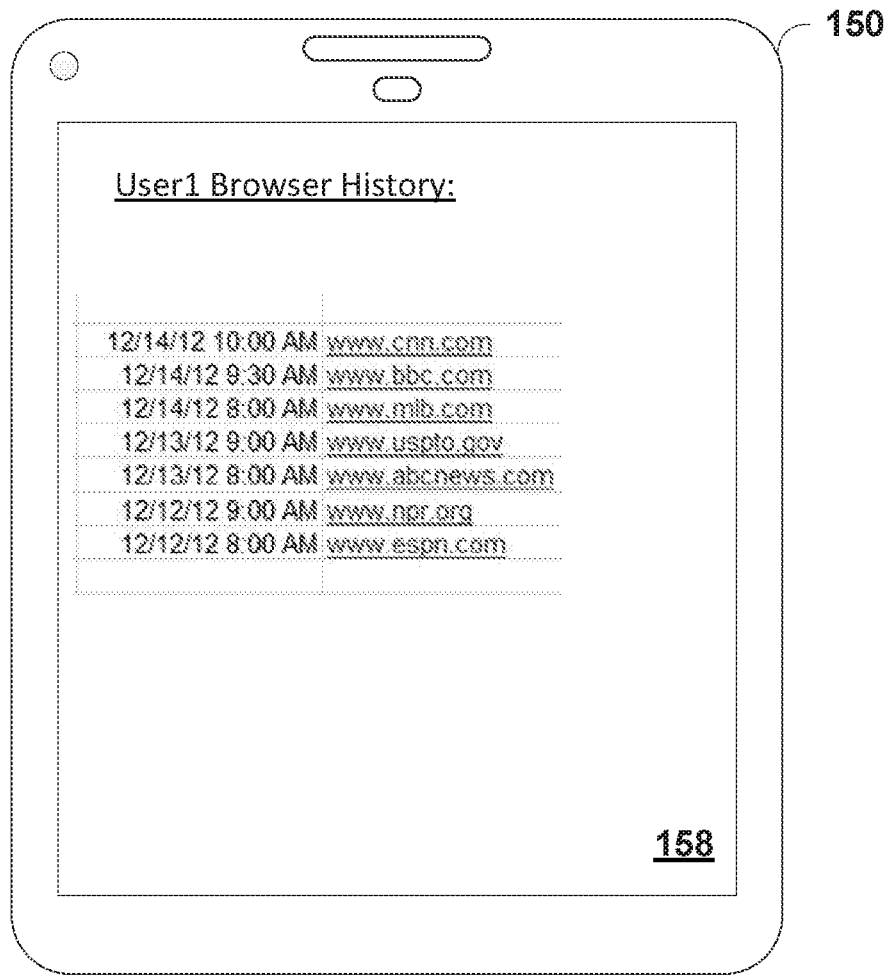
FIG. 13 shows a graphical user interface provided by a computing device, according to an example embodiment.
Figure 14:
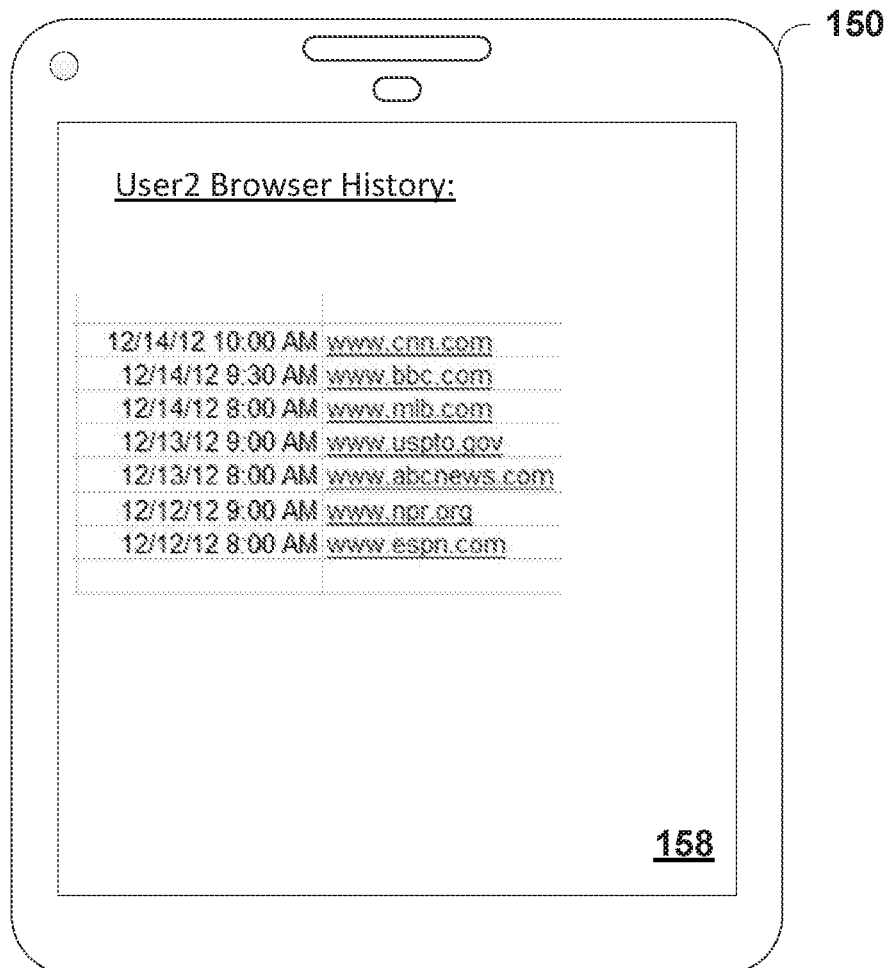
FIG. 14 shows a graphical user interface provided by a computing device, according to an example embodiment.

In another example, the data 105A stored at the data storage unit 154 may include a first internet browsing history that is associated with the first user-account and the data 105B may include a second internet browsing history that is associated with the second user-account. In this context, the instructions received from the computing device 100 by the computing device 150 may include instructions to edit the first internet browsing history to indicate that the first user-account browsed a particular web location via the computing device 100 during the multi-user login session and instructions to edit the second internet browsing history to indicate that the second user-account browsed the particular web location via the computing device 100 during the multi-user login session. FIG. 13 shows the computing device 150 displaying an updated browser history corresponding to the first user-account that includes websites visited during the multi-user login session. FIG. 14 shows the computing device 150 displaying an updated browser history corresponding to the second user-account that includes websites visited during the multi-user login session.

In some examples, the instructions received by the computing device 150 from the computing device 100 indicate that the computing device 150 is allowed to edit particular portions of the data 105B based on the multi-user login session conducted on the computing device 100, but not other portions of the data 105B.

In some examples, the method 400 may involve the use of "OAuth," "OpenID," or similar protocols for allowing a third-party network access to user data stored at data storage 104 or data storage 154.

At block 502, the method 500 includes receiving, by a first computing device, a first user credential and a second user credential. For example, the computing device 100 may receive the user credentials 109 and 111 via the user interface 108, or perhaps from another device via a wired or wireless communication protocol. In some examples, block 502 may involve receiving user credentials corresponding respectively to three or more user-accounts.

At block 504, the method 500 includes sending, to a second computing device, the first user credential and the second user credential. For instance, the computing device 100 may send, to the computing device 150, the user credentials 109 and 111. In some examples, block 504 may involve sending user credentials corresponding respectively to three or more user-accounts.

At block 506, the method 500 includes receiving, from the second computing device, an indication that the first user credential corresponds to a first user-account and that the second user credential corresponds to a second user-account. For example, the computing device 100 may receive, from the computing device 150, an indication that the user credential 109 corresponds to the first user-account and the user credential 111 corresponds to the second user-account. In some examples, block 506 may involve receiving an indication that the user credentials sent at block 504 correspond respectively to three or more user-accounts.

At block 508, the method 500 includes receiving, from the second computing device, output data that is customized for both the first user-account and the second user-account based on analysis of first data and analysis of second data. In this context, the first data is access-protected via the first user credential and is associated with the first user-account, and the second data is access-protected via the second user credential and is associated with the second user-account. For instance, the computing device 100 may receive, from the computing device 150, output data that is customized for both the first user-account and the second user-account based on analysis of the data 105A and the data 105B stored at the data storage unit 154, as described in more detail below. In some examples, block 508 may involve receiving output data that is customized for three or more user-accounts based on analysis of data corresponding respectively to the three or more user-accounts.

At block 510, the method 500 includes providing, via a user interface, output representing the output data. For example, the computing device 100 may display or otherwise provide the output data via the user interface 108. After some time, the one or more additional user accounts might log off the multi-user login session to revert back to a single-user login session. In some examples, block 510 may involve providing output representing output data customized for three or more user-accounts.

As described above with regard to the method 300, in some examples the data 105A may include first calendar data and one or more first user preferences that are associated with the first user-account. Additionally, the data 105B may include second calendar data and one or more second user preferences that are associated with the second user-account. In this context, the computing device 150 analyzing the data 105A and the data 105B may include the computing device 150 determining that the first calendar data and the second calendar data share a calendar entry (e.g., calendar entries having a common title, start time, end time, invitees, etc.), and the computing device 150 analyzing the one or more first user preferences and the one or more second user preferences. In this context, the output data sent by the computing device 150 to the computing device 100 may include a suggested venue for the shared calendar entry.

For example, the shared calendar entry may be a lunch meeting. By analyzing the user preferences associated respectively with the first user-account and the second user-account, the computing device 150 may determine that respective users associated with the first user-account and the second user-account may have both expressed interest in barbeque, steak, buffets, and Italian food. Accordingly, the computing device 150 may send output data including suggestions that the lunch meeting take place at "Bill's BBQ Pit," "J.R.'s Steakhouse," "Main St. Bottomless Buffet," or "Adrian's Italian Cafe," as shown in FIG. 7. FIG. 7 depicts the user interface 108 of the computing device 100 displaying such output data after receiving the output data from the computing device 150.

In another example, the shared calendar entry may be a vacation or another planned trip. By analyzing the user preferences associated respectively with the first user-account and the second user-account, the computing device 150 may determine that respective users associated with the first user-account and the second user-account may have both expressed interest in mountain climbing, horseback riding, and surfing. Accordingly, the computing device 150 may send output data including suggestions that the users visit a particular mountain range, stable, or beach near their planned destination.

As described above with regard to the method 300, in some examples the data 105A may include one or more first user preferences that are associated with the first user-account. Additionally, the data 105B may include one or more second user preferences that are associated with the second user-account. In this context, the computing device 150 analyzing the data 105A and the data 105B may include the computing device 150 analyzing the one or more first user preferences and the one or more second user preferences. The output data sent by the computing device 150 to the computing device 100 may include a news feed that includes one or more media items that are each associated with the one or more first user preferences and the one or more second user preferences. By analyzing the user preferences associated respectively with the first user-account and the second user-account, the computing device 150 may determine that respective users associated with the first user-account and the second user-account may have both expressed interest in sports, weather, politics, and astronomy. Accordingly, the computing device 150 may send output data including links to news articles respectively headlined "Late TD Propels NY Ferrets Over Boston Weasels 21-17," "Cold, Icy Conditions to Continue for the Remainder of the Week," "Senator Smith Announces Presidential Run," and "SETI: 'Still no aliens,'" as shown in FIG. 8. FIG. 8 depicts the user interface 108 of the computing device 100 displaying such output data after receiving the output data from the computing device 150.

As described above with regard to the method 300, in some examples the one or more user preferences associated with the first user-account may include a first contact or "friend" list and the one or more second user preferences associated with the second user-account may include a second contact or "friend" list. In this context, the one or more media items (e.g., social media "posts") of the news feed are each associated with a user-account that is included in both the first contact list and in the second contact list. Accordingly, the computing device 150 may send output data including posts respectively associated with "Friend 1," "Friend 2," "Friend 3," and "Friend 4," as shown in FIG. 9. In some examples, such user-accounts may be limited to a subset of user-accounts appearing on a contact list. The subset could be selected manually by a user, or the user-accounts may be selected automatically based on factors such as the user's frequency of interaction with such user-accounts. FIG. 9 depicts the user interface 108 of the computing device 100 displaying such output data after receiving the output data from the computing device 150.

As described above with regard to the method 300, in some examples the computing device 150 may receive a search string from the computing device 100. In this context, the search string may be entered via the user interface 108 and thereafter sent to the computing device 150 by the computing device 100. Referring to FIG. 10, for example, the search string may include the phrase "class notes." Furthermore, the data 105A may include one or more first emails that are associated with the first user-account and the data 105B may include one or more second emails that are associated with the second user-account. In this context, the computing device 150 analyzing the data 105A and the data 105B may include analyzing the one or more first emails and the one or more second emails. Accordingly, the output data may include at least one email from the one or more first emails or the one or more second emails such that the at least one email contains the search string. As such, the computing device 150 may send output data including emails associated with the first user-account and/or emails associated with the second user-account that contain the string "class notes" as shown in FIG. 10. FIG. 10 depicts the user interface 108 of the computing device 100 displaying such output data after receiving the output data from the computing device 150.

As described above with regard to the method 300, in some examples the data 105A may include an internet browsing history that is associated with the first user-account and the data 105B may include an internet browsing history that is associated with the second user-account. For example, the data 105A may include web addresses corresponding to web pages visited during one or more login sessions corresponding to the first user-account and dates and times during which the respective web pages were visited. In this context, the computing device 150 analyzing the data 105A and the data 105B may include accessing the internet browsing histories associated respectively with the first user-account and the second user-account. Accordingly, the output data may include a combined internet browsing history that includes at least a portion of the browsing history associated with the first user-account and at least a portion of the browsing history associated with the second user-account. FIG. 11 depicts the user interface 108 of the computing device 100 displaying such output data after receiving the output data from the computing device 150.

In some examples, the computing device 100 may receive, via the user interface 108, an instruction to enter a multi-user login session by authenticating the first user-account and the second user-account. The computing device 100 may responsively provide, via the user interface 108, a request to provide the second user credential as shown in FIG. 12. Accordingly, the computing device 100 may receive the user credential 111 via the graphical user interface provided by the user interface 108.

In some examples, the method 500 may involve the use of "OAuth," "OpenID," or similar protocols for allowing a third-party network access to user data stored at data storage 104 or data storage 154.

At block 602, the method 600 includes receiving, by a first computing device, a first user credential and a second user credential. In some examples, block 602 may involve receiving user credentials corresponding to three or more user-accounts.

At block 604, the method 600 includes sending, by the first computing device to a second computing device, the first user credential and the second user credential. In some examples, block 604 may involve sending user credentials corresponding to three or more user-accounts.

At block 606, the method 600 includes receiving, from the second computing device, an indication that the first user credential corresponds to a first user-account and that the second user credential corresponds to a second user-account. In some examples, block 606 may involve receiving an indication that the user credentials sent at block 604 correspond respectively to three or more user-accounts.

At block 608, the method 600 includes sending, to the second computing device, instructions to edit first data and second data based on a multi-user login session that is conducted on the first computing device after receiving the indication. In this context, the multi-user login session is detailed by the instructions, and the first data corresponds to the first user-account and the second data corresponds to the second user-account. In some examples, block 608 may involve sending instructions to edit data corresponding respectively to three or more user-accounts. After some time, the one or more additional user accounts might log off the multi-user login session to revert back to a single-user login session.

As described above with regard to the method 400, in some examples the data 105A may include a first advertisement interaction history corresponding to the first user-account and the data 105B may include a second advertisement interaction history corresponding to the second user-account. For instance, the first advertisement interaction history may include data identifying advertisements that have been displayed or provided during a login session corresponding to the first user-account. The first advertisement interaction history may further indicate whether the first user-account interacted with (e.g., clicked on) each of the advertisements. The second advertisement interaction history may include data identifying advertisements that have been displayed or provided during a login session corresponding to the second user-account. The second advertisement interaction history may further indicate whether the second user-account interacted with (e.g., clicked on) each of the advertisements. The instructions received by the computing device 150 from the computing device 100 may include instructions to edit the first advertisement interaction history to indicate that the first user-account did (or did not) interact with a particular advertisement provided by the computing device 100 during the multi-user login session and instructions to edit the second advertisement interaction history to indicate that the second user-account did (or did not) interact with the particular advertisement during the multi-user login session.

As described above with regard to the method 400, in some examples the data 105A stored at the data storage unit 154 may include a first internet browsing history that is associated with the first user-account and the data 105B may include a second internet browsing history that is associated with the second user-account. In this context, the instructions received from the computing device 100 by the computing device 150 may include instructions to edit the first internet browsing history to indicate that the first user-account browsed a particular web location via the computing device 100 during the multi-user login session and instructions to edit the second internet browsing history to indicate that the second user-account browsed the particular web location via the computing device 100 during the multi-user login session. FIG. 13 shows the computing device 150 displaying an updated browser history corresponding to the first user-account that includes websites visited during the multi-user login session. FIG. 14 shows the computing device 150 displaying an updated browser history corresponding to the second user-account that includes websites visited during the multi-user login session.

In some examples, the computing device 100 may receive, via the user interface 108, an instruction to enter a multi-user login session by authenticating the first user-account and the second user-account. The computing device 100 may responsively provide, via the user interface 108, a request to provide the second user credential as shown in FIG. 12. Accordingly, the computing device 100 may receive the user credential 111 via the graphical user interface provided by the user interface 108.

In some examples, the method 600 may involve the use of "OAuth," "OpenID," or similar protocols for allowing a third-party network access to user data stored at data storage 104 or data storage 154.

Generally, one or more prediction algorithms, decision trees, hidden Markov models, feed-forward neural networks, and/or machine learning could be used to determine which access rights should be granted on log-in. This determination could take into account past login sessions, features from past collaboration between the two user-accounts, place and time of day, etc.

In some examples, a multi-user login session may begin with a "baseline" of access privileges that can be manually expanded if desired. For example, at the outset, read and/or write access might be limited to information or categories of information that pertain to all user-accounts that are participating in the multi-user login session. Thereafter, read and/or write access might be expanded (e.g., via user input) to include information or categories of information that only pertain to single user-accounts or various combinations of the user-accounts participating in the multi-user login session.

Computing device 100 and/or 150 may determine which information is to be accessible during the multi-user login session in a number of ways. For example, each access to information pertaining to a secondary user-account (read or write) may be authorized explicitly via user input. In another example, the computing device 100 and/or 150 may automatically determine which sets of information require explicit authorization prior to access. For example, if the two (or more) user-accounts have a shared calendar entry, topics associated with the shared calendar entry may be accessible via the multi-user login session without explicit authorization. Also, a group of access rights could be bundled together. For example, if access to credit card information for the secondary user-account has been granted, all other payment instruments associated with the secondary user-account may be accessible via the multi-user login session as well. Further, a prediction algorithm could be used to predict which access rights are granted upon log-in. This prediction could be based on characteristics (e.g., place or time) of past multi-user login sessions between the two (or more) user-accounts.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are contemplated herein.

Embodiments of the present disclosure can thus relate to one of the enumerated example embodiment (EEEs) listed below.

1. A method comprising:
   establishing a single-user login session associated with a first user-account such that the single-user login session has read and/or write access to first user data associated with the first user-account; and
   accepting, within the single-user login session, a further login associated with a second user-account to convert the single-user login session to a multi-user login session having read and/or write access to second user data associated with the second user-account in addition to having read and/or write access to the first user data.

2. The method of embodiment 1, wherein the single-user login session and the multi-user login session are both provided by an operating system.

3. The method of any of embodiments 1-2, further comprising:
   providing a graphical user interface for the multi-user login session; and
   reading the second user data or writing to the second user data based on input received via the graphical user interface.

4. The method of any of embodiments 1-3, further comprising executing, in the multi-user login session, a software application for which both the first user data and the second user data are applicable.

5. The method of embodiment 4, further comprising displaying, via the application, both the first user data and the second user data that are applicable to the application.

6. The method of embodiment 4 or 5, further comprising updating both the first user data and the second user data that are applicable to the application with data generated by execution of the application in the multi-user user session.

7. The method of any of embodiments 1-6, further comprising:
   receiving, by a first computing device from a second computing device, a first user credential and a second user credential;
   determining, by the first computing device, that the first user credential corresponds to a first user-account and that the second user credential corresponds to a second user-account;
   in response to determining that the first user credential corresponds to the first user-account and that the second user credential corresponds to the second user-account, analyzing first data and second data, wherein the first data is access-protected via the first user credential and is associated with the first user-account, and wherein the second data is access-protected via the second user credential and is associated with the second user-account; and
   sending, to the second computing device, output data that is customized for both the first user-account and the second user-account based on the analysis of the first data and the second data.

8. The method of any of embodiments 1-7,
   wherein the first data comprises first calendar data and one or more first user preferences that are associated with the first user-account,
   wherein the second data comprises second calendar data and one or more second user preferences that are associated with the second user-account,
   wherein analyzing the first data and the second data comprises:
      determining that the first calendar data and the second calendar data share a calendar entry; and
      analyzing the one or more first user preferences and the one or more second user preferences, and
   wherein the output data comprises a suggested venue for the shared calendar entry.

9. The method of any of embodiments 1-7,
   wherein the first data comprises one or more first user preferences that are associated with the first user-account,
   wherein the second data comprises one or more second user preferences that are associated with the second user-account,
   wherein analyzing the first data and the second data comprises analyzing the one or more first user preferences and the one or more second user preferences, and
   wherein the output data comprises a news feed comprising one or more media items that are each associated with the one or more first user preferences and the one or more second user preferences.

10. The method of embodiment 9,
wherein the one or more first user preferences comprise a first contact list and the one or more second user preferences comprise a second contact list, and
wherein the one or more media items are each associated with a respective user-account that is included in the first contact list and in the second contact list.

11. The method of any of embodiments 1-7, further comprising:
receiving a search string from the second computing device,
wherein the first data comprises one or more first emails that are associated with the first user-account,
wherein the second data comprises one or more second emails that are associated with the second user-account,
wherein analyzing the first data and the second data comprises analyzing the one or more first emails and the one or more second emails, and
wherein the output data comprises at least one email from the one or more first emails or the one or more second emails, and wherein the at least one email contains the search string.

12. The method of any of embodiments 1-7,
wherein the first data comprises a first internet browsing history that is associated with the first user-account,
wherein the second data comprises a second internet browsing history that is associated with the second user-account,
wherein analyzing the first data and the second data comprises analyzing the first internet browsing history and the second internet browsing history, and
wherein the output data comprises a combined internet browsing history that includes at least a portion of the first internet browsing history and at least a portion of the second internet browsing history.

13. The method of any of embodiments 1-7, further comprising: receiving, from the second computing device, a request to send the output data.

14. The method of embodiment 13, wherein the request includes a message indicating that the output data is allowed to include the second data but not other data associated with the second user-account.

15. The method of any of embodiments 1-7, further comprising:
determining that a predetermined amount of time passed since receiving the second user credential from the second computing device;
after determining that the predetermined amount of time passed, receiving, from the second computing device, a request to send additional output data that is customized for both the first user-account and the second user-account; and
based on determining that the predetermined amount of time passed and based on receiving the request, sending, to the second computing device, a request for the second computing device to reacquire a user credential that corresponds to the second user-account.

16. The method of embodiment 15, further comprising:
receiving, from the second computing device, the requested user credential; and
in response to receiving the requested user credential, sending the additional output data.

17. The method of any of embodiments 1-7, further comprising:
receiving, from a third computing device associated with the second user-account, a request that information that is access-protected via the second user credential no longer be communicated between the first computing device and the second computing device; and
sending, to the second computing device, a notification that information that is access-protected via the second user credential is no longer to be communicated between the first computing device and the second computing device.

18. The method of any of embodiments 1-7, further comprising:
receiving, from a third computing device associated with the second user-account, location data indicating a location of the third computing device; and
in response to determining that the third computing device is within a threshold distance of the second computing device, sending, to the second computing device, an instruction to provide, via a user interface of the second computing device, output requesting the second user credential.

19. The method of embodiment 18, further comprising:
determining that the first user-account has conducted a past multi-user login session on a shared device with the second user-account,
wherein sending the instruction comprises sending the instruction additionally in response to determining that the first user-account has conducted the past multi-user login session on the shared device with the second user-account.

20. The method of embodiment 18, further comprising:
determining that the second user-account appears on a contact list of the first user-account,
wherein sending the instruction comprises sending the instruction additionally in response to determining that the second user-account appears on the contact list of the first user-account.

21. The method of embodiment 18, further comprising:
receiving, from the third computing device, updated location data indicating an updated location of the third computing device; and
in response to determining that the updated location of the third computing device is greater than a threshold distance away from the second computing device, sending, to the second computing device, a notification that information that is access-protected via the second user credential is no longer to be communicated between the first computing device and the second computing device.

22. The method of any of embodiments 1-6, further comprising:
receiving, by a first computing device from a second computing device, a first user credential and a second user credential;
determining, by the first computing device, that the first user credential corresponds to a first user-account and that the second user credential corresponds to a second user-account;
in response to determining that the first user credential corresponds to the first user-account and that the second user credential corresponds to the second user-account, sending, to the second computing device, an indication that the first user credential corresponds to the first user-account and that the second user credential corresponds to the second user-account;

receiving, from the second computing device, instructions to edit first data corresponding to the first user-account and to edit second data corresponding to the second user-account; and editing the first data and the second data based on a multi-user login session that is detailed by the instructions, wherein the multi-user login session is conducted on the second computing device and involves the first user-account and the second user-account being authenticated by the second computing device.

23. The method of embodiment 22,
wherein the first data comprises a first advertisement interaction history corresponding to the first user-account,
wherein the second data comprises a second advertisement interaction history corresponding to the second user-account, and
wherein the instructions comprise instructions to edit the first advertisement interaction history to indicate that the first user-account did not interact with a particular advertisement provided by the second computing device during the multi-user login session and instructions to edit the second advertisement interaction history to indicate that the second user-account did not interact with the particular advertisement during the multi-user login session.

24. The method of embodiment 22,
wherein the first data comprises an advertisement interaction history corresponding to the first user-account,
wherein the second data comprises an advertisement interaction history corresponding to the second user-account, and
wherein the instructions comprise instructions to edit the first advertisement interaction history to indicate that the first user-account interacted with a particular advertisement provided by the second computing device during the multi-user login session and instructions to edit the second advertisement interaction history to indicate that the second user-account interacted with the particular advertisement during the multi-user login session.

25. The method of embodiment 22,
wherein the first data comprises a first internet browsing history that is associated with the first user-account,
wherein the second data comprises a second internet browsing history that is associated with the second user-account, and
wherein the instructions comprise instructions to edit the first internet browsing history to indicate that the first user-account browsed a particular web location via the second computing device during the multi-user login session and instructions to edit the second internet browsing history to indicate that the second user-account browsed the particular web location via the second computing device during the multi-user login session.

26. The method of embodiment 22, wherein the instructions indicate that the first computing device is allowed to edit the second data but not other data associated with the second user-account.

27. The method of embodiment 22, further comprising:
determining that a predetermined amount of time passed since receiving the second user credential from the second computing device;
after determining that the predetermined amount of time passed, receiving, from the second computing device, additional instructions to edit the second data; and based on determining that the predetermined amount of time passed and based on receiving the additional instructions, sending, to the second computing device, a request for the second computing device to reacquire a user credential that corresponds to the second user-account.

28. The method of embodiment 27, further comprising:
receiving, from the second computing device, the requested user credential; and
in response to receiving the requested user credential, executing the additional instructions to edit the second data.

29. The method of embodiment 22, further comprising:
receiving, from a third computing device, a request that information that is access-protected via the second user credential no longer be communicated between the first computing device and the second computing device; and
sending, to the second computing device, a notification that information that is access-protected via the second user credential is no longer to be communicated between the first computing device and the second computing device.

30. The method of embodiment 22, further comprising:
receiving, from a third computing device associated with the second user-account, location data indicating a location of the third computing device; and
in response to determining that the third computing device is within a threshold distance of the second computing device, sending, to the second computing device, an instruction to provide, via a user interface of the second computing device, output requesting the second user credential.

31. The method of embodiment 30, further comprising:
determining that the first user-account has conducted a past multi-user login session with the second user-account,
wherein sending the instruction comprises sending the instruction additionally in response to determining that the first user-account has conducted the past multi-user login session with the second user-account.

32. The method of embodiment 30, further comprising:
determining that the second user-account appears on a contact list of the first user-account,
wherein sending the instruction comprises sending the instruction additionally in response to determining that the second user-account appears on the contact list of the first user-account.

33. The method of embodiment 30, further comprising:
receiving, from the third computing device, updated location data indicating an updated location of the third computing device; and
in response to determining that the updated location of the third computing device is greater than a threshold distance away from the second computing device, sending, to the second computing device, a notification that information that is access-protected via the second user credential is no longer to be communicated between the first computing device and the second computing device.

34. The method of any of embodiments 1-6, further comprising:
receiving, by a first computing device, a first user credential and a second user credential;
sending, to a second computing device, the first user credential and the second user credential;

receiving, from the second computing device, an indication that the first user credential corresponds to a first user-account and that the second user credential corresponds to a second user-account;

receiving, from the second computing device, output data that is customized for both the first user-account and the second user-account based on analysis of first data and analysis of second data, wherein the first data is access-protected via the first user credential and is associated with the first user-account, and wherein the second data is access-protected via the second user credential and is associated with the second user-account; and providing, via a user interface, output representing the output data.

35. The method of embodiment 34,
wherein the first data comprises first calendar data that is associated with the first user-account,
wherein the second data comprises second calendar data that is associated with the second user-account, and
wherein the output data comprises a suggested venue for a calendar entry that appears in both the first calendar data and the second calendar data.

36. The method of embodiment 34,
wherein the first data comprises one or more first user preferences that are associated with the first user-account,
wherein the second data comprises one or more second user preferences that are associated with the second user-account, and
wherein the output data comprises a news feed comprising one or more media items that are each associated with the one or more first user preferences and the one or more second user preferences.

37. The method of embodiment 36,
wherein the one or more first user preferences comprise a first contact list and the one or more second user preferences comprise a second contact list, and
wherein the one or more media items are each associated with a respective user-account that is included in the first contact list and in the second contact list.

38. The method of embodiment 34, further comprising:
sending a search string to the second computing device,
wherein the first data comprises one or more first emails that are associated with the first user-account,
wherein the second data comprises one or more second emails that are associated with the second user-account, and
wherein the output data comprises at least one email from the one or more first emails or the one or more second emails, wherein the at least one email contains the search string.

39. The method of embodiment 34,
wherein the first data comprises a first internet browsing history that is associated with the first user-account,
wherein the second data comprises a second internet browsing history that is associated with the second user-account, and
wherein the output data comprises a combined internet browsing history that includes at least a portion of the first internet browsing history and at least a portion of the second internet browsing history.

40. The method of embodiment 34, further comprising:
sending, to the second computing device, a request to receive the output data.

41. The method of embodiment 40, wherein the request includes a message indicating that the output data is allowed to include the second data but not other data associated with the second user-account.

42. The method of embodiment 34, wherein receiving the second user credential comprises receiving the second user credential from a third computing device that is associated with the second user-account.

43. The method of embodiment 34, wherein receiving the second user credential comprises receiving input representing the second user credential via a user interface of the first computing device.

44. The method of embodiment 34, further comprising:
receiving, via a user interface of the first computing device, an instruction to enter a multi-user login session by authenticating the first user-account and the second user-account; and
providing, via the user interface, a request to provide the second user credential,
wherein the second user credential is received by the first computing device after providing the request.

45. The method of any of embodiments 1-6, further comprising:
receiving, by a first computing device, a first user credential and a second user credential;
sending, by the first computing device to a second computing device, the first user credential and the second user credential;
receiving, from the second computing device, an indication that the first user credential corresponds to a first user-account and that the second user credential corresponds to a second user-account; and
sending, to the second computing device, instructions to edit first data and second data based on a multi-user login session that is conducted on the first computing device after receiving the indication, wherein the multi-user login session is detailed by the instructions, and wherein the first data corresponds to the first user-account and the second data corresponds to the second user-account.

46. The method of embodiment 45,
wherein the first data comprises a first advertisement interaction history corresponding to the first user-account,
wherein the second data comprises a second advertisement interaction history corresponding to the second user-account, and
wherein the instructions comprise instructions to edit the first advertisement interaction history to indicate that the first user-account did not interact with a particular advertisement provided by the first computing device during the multi-user login session and instructions to edit the second advertisement interaction history to indicate that the second user-account did not interact with the particular advertisement during the multi-user login session.

47. The method of embodiment 45,
wherein the first data comprises a first advertisement interaction history corresponding to the first user-account,
wherein the second data comprises a second advertisement interaction history corresponding to the second user-account, and
wherein the instructions comprise instructions to edit the first advertisement interaction history to indicate that the first user-account interacted with a particular advertisement provided by the first computing device during the multi-user login session and instructions to edit the second advertisement interaction history to indicate that the second user-account interacted with the particular advertisement during the multi-user login session.

48. The method of embodiment 45,
wherein the first data comprises a first internet browsing history that is associated with the first user-account,
wherein the second data comprises a second internet browsing history that is associated with the second user-account, and
wherein the instructions comprise instructions to edit the first internet browsing history to indicate that the first user-account browsed a particular web location via the first computing device during the multi-user login session and instructions to edit the second internet browsing history to indicate that the second user-account browsed the particular web location via the first computing device during the multi-user login session.

49. The method of embodiment 45, wherein the instructions indicate that the second computing device is allowed to edit the second data but not other data associated with the second user-account.

50. The method of embodiment 45, wherein receiving the second user credential comprises receiving the second user credential from a third computing device that is associated with the second user-account.

51. The method of embodiment 45, wherein receiving the second user credential comprises receiving input representing the second user credential via a user interface of the first computing device.

52. The method of embodiment 45, further comprising:
receiving, via a user interface of the first computing device, an instruction to enter the multi-user login session by authenticating the first user-account and the second user-account; and
providing, via the user interface, a request to provide the second user credential,
wherein the second user credential is received by the first computing device after providing the request.

53. A computer readable medium storing instructions, that when executed by one or more computing devices, cause the one or more computing devices to perform any of the methods of embodiments 1-52.

54. The computer readable medium of embodiment 53, wherein the computer readable medium is a non-transitory computer readable medium.

55. One or more computing devices, each of the one or more computing devices comprising:
one or more processors; and
a non-transitory computer readable medium storing instructions, that when executed by the one or more computing devices, cause the one or more computing devices to perform any of the methods of embodiments 1-52.

What is claimed is:

1. A method comprising:
establishing a single-user login session associated with a first user-account such that the single-user login session has read and/or write access to first user data associated with the first user-account;
accepting, within the single-user login session, a further login associated with a second user-account to convert the single-user login session to a multi-user login session having read and/or write access to second user data associated with the second user-account in addition to having read and/or write access to the first user data;
receiving, by a first computing device from a second computing device, a first user credential and a second user credential;
determining, by the first computing device, that the first user credential corresponds to a first user-account and that the second user credential corresponds to a second user-account;
in response to determining that the first user credential corresponds to the first user-account and that the second user credential corresponds to the second user-account, analyzing first data and second data, wherein the first data is access-protected via the first user credential and is associated with the first user-account, and wherein the second data is access-protected via the second user credential and is associated with the second user-account;
sending, to the second computing device, output data that is customized for both the first user-account and the second user-account based on the analysis of the first data and the second data;
receiving, from a third computing device associated with the second user-account, a request that information that is access-protected via the second user credential no longer be communicated between the first computing device and the second computing device; and
sending, to the second computing device, a notification that information that is access-protected via the second user credential is no longer to be communicated between the first computing device and the second computing device.

2. The method of claim 1, wherein the single-user login session and the multi-user login session are both provided by an operating system.

3. The method of claim 1, further comprising:
providing a graphical user interface for the multi-user login session; and
reading the second user data or writing to the second user data based on input received via the graphical user interface.

4. The method of claim 1, further comprising executing, in the multi-user login session, a software application for which both the first user data and the second user data are applicable.

5. The method of claim 4, further comprising displaying, via the application, both the first user data and the second user data that are applicable to the application.

6. The method of claim 4, further comprising updating both the first user data and the second user data that are applicable to the application with data generated by execution of the application in the multi-user user session.

7. The method of claim 1,
wherein the first data comprises first calendar data and one or more first user preferences that are associated with the first user-account,
wherein the second data comprises second calendar data and one or more second user preferences that are associated with the second user-account,
wherein analyzing the first data and the second data comprises:
determining that the first calendar data and the second calendar data share a calendar entry; and
analyzing the one or more first user preferences and the one or more second user preferences, and wherein the output data comprises a suggested venue for the shared calendar entry.

8. The method of claim 1,
wherein the first data comprises one or more first user preferences that are associated with the first user-account,
wherein the second data comprises one or more second user preferences that are associated with the second user-account,
wherein analyzing the first data and the second data comprises analyzing the one or more first user preferences and the one or more second user preferences, and
wherein the output data comprises a news feed comprising one or more media items that are each associated with the one or more first user preferences and the one or more second user preferences.

9. The method of claim 8,
wherein the one or more first user preferences comprise a first contact list and the one or more second user preferences comprise a second contact list, and
wherein the one or more media items are each associated with a respective user-account that is included in the first contact list and in the second contact list.

10. The method of claim 1, further comprising:
receiving a search string from the second computing device,
wherein the first data comprises one or more first emails that are associated with the first user-account,
wherein the second data comprises one or more second emails that are associated with the second user-account,
wherein analyzing the first data and the second data comprises analyzing the one or more first emails and the one or more second emails, and
wherein the output data comprises at least one email from the one or more first emails or the one or more second emails, and wherein the at least one email contains the search string.

11. The method of claim 1,
wherein the first data comprises a first internet browsing history that is associated with the first user-account,
wherein the second data comprises a second internet browsing history that is associated with the second user-account,
wherein analyzing the first data and the second data comprises analyzing the first internet browsing history and the second internet browsing history, and
wherein the output data comprises a combined internet browsing history that includes at least a portion of the first internet browsing history and at least a portion of the second internet browsing history.

12. The method of claim 1, further comprising: receiving, from the second computing device, a request to send the output data.

13. The method of claim 12, wherein the request includes a message indicating that the output data is allowed to include the second data but not other data associated with the second user-account.

14. The method of claim 1, further comprising:
determining that a predetermined amount of time passed since receiving the second user credential from the second computing device;
after determining that the predetermined amount of time passed, receiving, from the second computing device, a request to send additional output data that is customized for both the first user-account and the second user-account; and
based on determining that the predetermined amount of time passed and based on receiving the request, sending, to the second computing device, a request for the second computing device to reacquire a user credential that corresponds to the second user-account.

15. The method of claim 14, further comprising:
receiving, from the second computing device, the requested user credential; and
in response to receiving the requested user credential, sending the additional output data.

16. The method of claim 1, further comprising:
receiving, from a third computing device associated with the second user-account, location data indicating a location of the third computing device; and
in response to determining that the third computing device is within a threshold distance of the second computing device, sending, to the second computing device, an instruction to provide, via a user interface of the second computing device, output requesting the second user credential.

17. The method of claim 16, further comprising:
determining that the first user-account has conducted a past multi-user login session on a shared device with the second user-account,
wherein sending the instruction comprises sending the instruction additionally in response to determining that the first user-account has conducted the past multi-user login session on the shared device with the second user-account.

18. The method of claim 16, further comprising:
determining that the second user-account appears on a contact list of the first user-account,
wherein sending the instruction comprises sending the instruction additionally in response to determining that the second user-account appears on the contact list of the first user-account.

19. A method comprising:
establishing a single-user login session associated with a first user-account such that the single-user login session has read and/or write access to first user data associated with the first user-account;
accepting, within the single-user login session, a further login associated with a second user-account to convert the single-user login session to a multi-user login session having read and/or write access to second user data associated with the second user-account in addition to having read and/or write access to the first user data;
receiving, by a first computing device from a second computing device, a first user credential and a second user credential;
determining, by the first computing device, that the first user credential corresponds to a first user-account and that the second user credential corresponds to a second user-account;
in response to determining that the first user credential corresponds to the first user-account and that the second user credential corresponds to the second user-account, analyzing first data and second data, wherein the first data is access-protected via the first user credential and is associated with the first user-account, and wherein the second data is access-protected via the second user credential and is associated with the second user-account;

sending, to the second computing device, output data that is customized for both the first user-account and the second user-account based on the analysis of the first data and the second data;
determining that a predetermined amount of time passed since receiving the second user credential from the second computing device;
after determining that the predetermined amount of time passed, receiving, from the second computing device, a request to send additional output data that is customized for both the first user-account and the second user-account; and
based on determining that the predetermined amount of time passed and based on receiving the request, sending, to the second computing device, a request for the second computing device to reacquire a user credential that corresponds to the second user-account.

20. A method comprising:
establishing a single-user login session associated with a first user-account such that the single-user login session has read and/or write access to first user data associated with the first user-account;
accepting, within the single-user login session, a further login associated with a second user-account to convert the single-user login session to a multi-user login session having read and/or write access to second user data associated with the second user-account in addition to having read and/or write access to the first user data;
receiving, by a first computing device from a second computing device, a first user credential and a second user credential;
determining, by the first computing device, that the first user credential corresponds to a first user-account and that the second user credential corresponds to a second user-account;
in response to determining that the first user credential corresponds to the first user-account and that the second user credential corresponds to the second user-account, analyzing first data and second data, wherein the first data is access-protected via the first user credential and is associated with the first user-account, and wherein the second data is access-protected via the second user credential and is associated with the second user-account;
sending, to the second computing device, output data that is customized for both the first user-account and the second user-account based on the analysis of the first data and the second data;
receiving, from a third computing device associated with the second user-account, location data indicating a location of the third computing device; and
in response to determining that the third computing device is within a threshold distance of the second computing device, sending, to the second computing device, an instruction to provide, via a user interface of the second computing device, output requesting the second user credential.

* * * * *